US011722839B2

United States Patent
Li et al.

(10) Patent No.: US 11,722,839 B2
(45) Date of Patent: Aug. 8, 2023

(54) SELF-LEARNING NETWORK GEOFENCES

(71) Applicant: Apple Inc., Cupertino, CA (US)

(72) Inventors: Li Li, Los Altos, CA (US); Raj Sukumar Chaugule, Santa Clara, CA (US); En Yang Zhang, Calgary (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/483,785

(22) Filed: Sep. 23, 2021

(65) Prior Publication Data

US 2023/0092500 A1    Mar. 23, 2023

(51) Int. Cl.
*H04W 48/12* (2009.01)
*H04W 4/021* (2018.01)
*H04B 17/336* (2015.01)
*H04B 17/327* (2015.01)
*H04W 24/10* (2009.01)

(52) U.S. Cl.
CPC .......... *H04W 4/022* (2013.01); *H04B 17/327* (2015.01); *H04B 17/336* (2015.01); *H04W 24/10* (2013.01)

(58) Field of Classification Search
CPC .............................. H04W 16/14; H04W 4/021
See application file for complete search history.

(56) References Cited

U.S. PATENT DOCUMENTS

2018/0242226 A1* 8/2018 He ........................ H04W 36/08
2023/0014894 A1* 1/2023 M M ..................... H04L 9/3247

\* cited by examiner

*Primary Examiner* — Zhiren Qin
(74) *Attorney, Agent, or Firm* — Fish & Richardson P.C

(57) ABSTRACT

Disclosed are methods, systems, apparatus, and computer programs for self-learning geofences is disclosed. In one aspect, a method involves gathering a plurality of data points associated with one or more Citizens Broadband Radio Service (CBRS) deployers; determining respective identifiers of the one or more CBRS deployers associated with the plurality of data points; clustering, based on the respective identifiers of the one or more CBRS deployers, the plurality of data points into one or more clusters, where each cluster is associated with one of the one or more CBRS deployers, and where each cluster is associated with a geofence of a network of the one or more CBRS deployers; identifying an opportunity for uploading the one or more clusters to a central server; and uploading the one or more clusters to the central server during the identified opportunity.

20 Claims, 25 Drawing Sheets

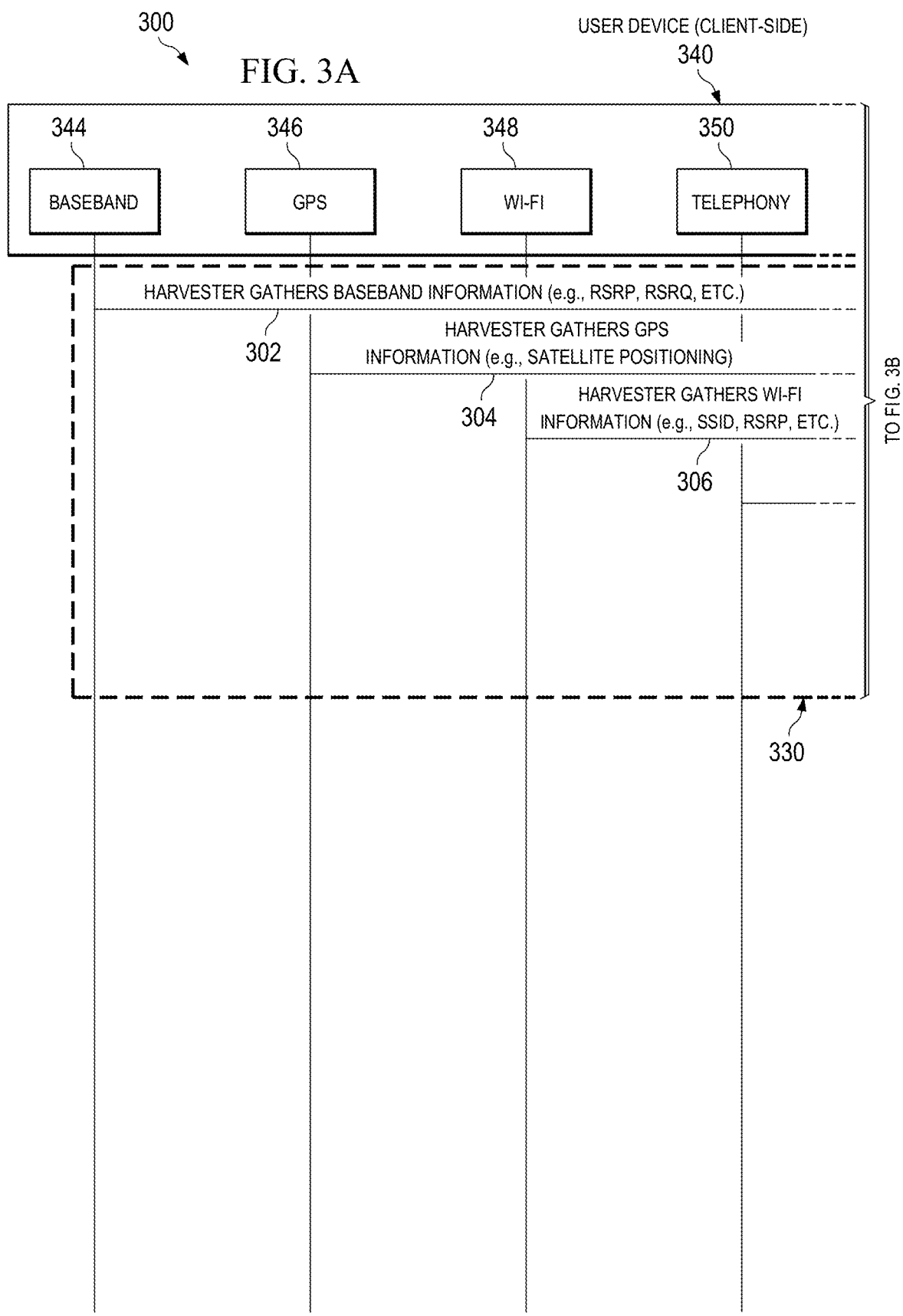

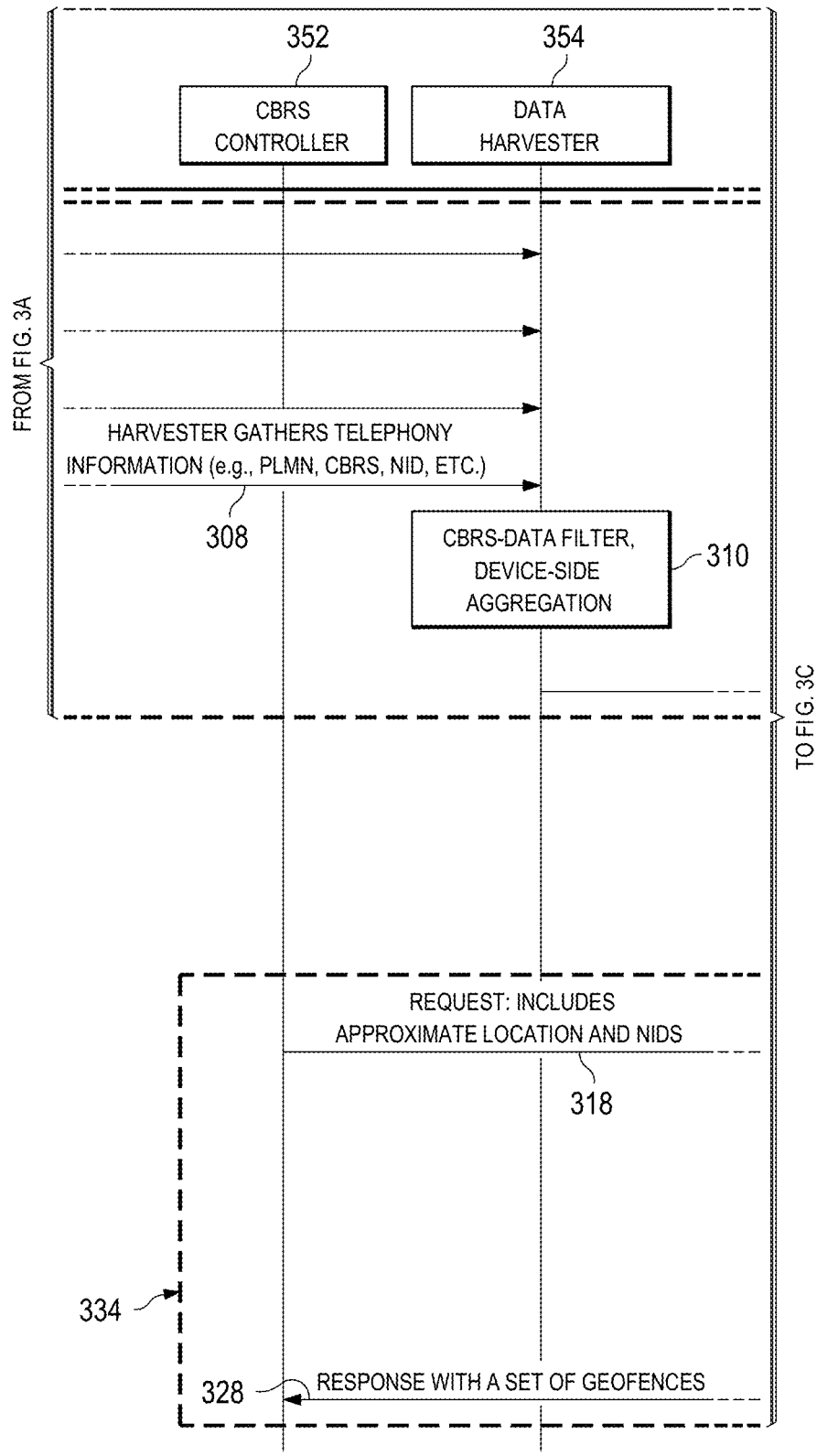

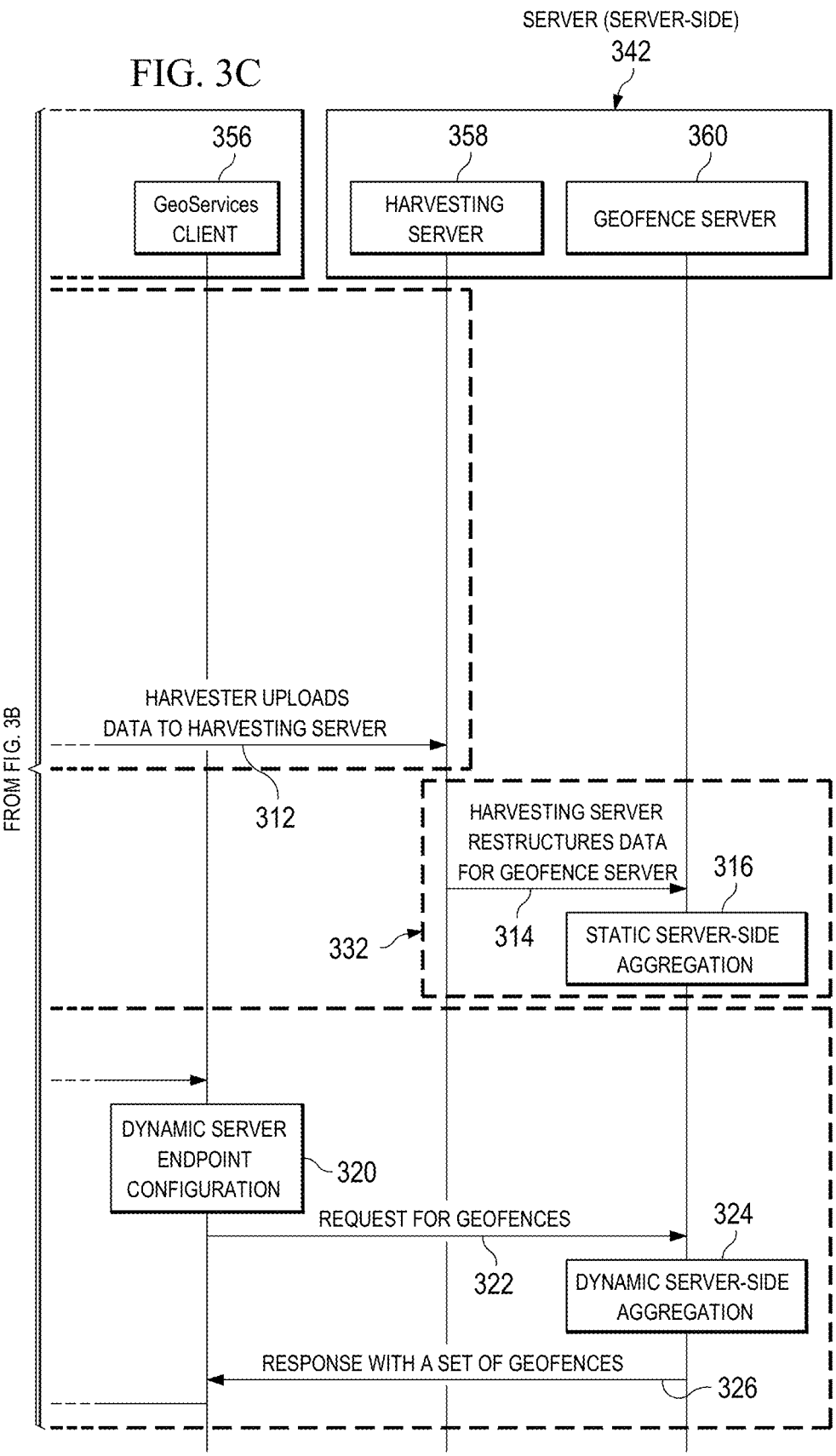

SELF-LEARNING NETWORK GEOFENCES

TECHNICAL FIELD

The disclosure relates to systems and techniques for self-learning network geofences.

BACKGROUND

One of the solutions that the wireless communications industry has developed to complement traditional carrier cellular networks is distributed antenna systems (DAS). DAS include a series of radio heads that are strategically placed around a targeted location in order to provide cellular coverage to that location (e.g., shopping malls, school campuses, office buildings, sporting stadiums, arenas, etc.). This solution is particularly attractive for enterprises that wish to deploy private networks. However, driven in part by rising bandwidth requirements and quality of service expectations, the deployment and maintenance of existing DAS has experienced a steady increase in cost.

The wireless communications industry has pursued a variety of service delivery models designed to offset the high costs while ensuring reliable and profitable coverage and capacity. One recently popular model is the neutral host DAS, or neutral host for short. The neutral host model shifts the ownership of the system from a carrier to either a building owner, DAS integrator, or a third-party system provider. Under this model, the independent third-party host assumes all financial, regulatory, legal, and technical responsibility for deploying, installing, and maintaining the system. The host may lease space or access to the system to one or more carriers or other operators (e.g. mobile virtual network operators [MVNOs]). The neutral host model provides a number of attractive benefits, among them an increased number of providers who are able to help satisfy the growing demand in the market.

To facilitate the installation, reduce the cost, and simplify the process and spread of effective neutral hosts, a new Citizens Broadband Radio Service (CBRS) for shared wireless broadband use of the 3550-3700 MHz band (3.5 GHz Band or Band 48) was established. CBRS provides potential benefits of indoor and outdoor cellular services, e.g., LTE/NR services within a shared 3.5 GHz spectrum by opening up those bands for commercial use such as carrier-based cellular service extensions and private LTE/NR networks within enterprises. Such services promise to complement, and in some cases possibly replace Wi-Fi, in addition to paving the way for 5G/NR wireless services. Thus, CBRS bands can be used by cellular networks to provide private LTE and neutral host networks (e.g. Wi-Fi Type deployments in buildings and enterprises) using LTE or 5G/NR small cells and networks.

SUMMARY

One of the differences between traditional cellular networks and CBRS networks is that CBRS networks typically have short range (e.g., a small coverage area). Currently, CBRS networks use geofences to define their coverage area, thereby ensuring user devices do not waste resources attempting to connect outside the coverage area. Geofencing uses global positioning system (GPS) or radio frequency identification (RFID) technology to create a virtual geographic boundary, enabling a trigger response when a mobile device enters or leaves a particular area. Such bounded areas and/or locations are also referred to as "geofencing areas" or "geofencing locations". A user device entering or leaving a geofencing area may trigger a response in the device. For example, entering a geofencing area associated with a CBRS network may trigger the user device to connect to the network.

In existing networks, a network operator provides user devices with geofencing information associated with CBRS networks of the network operator. However, this arrangement has many limitations. One issue is that a network operator may update CBRS deployment without notifying devices of the geofence update. Another issue is that some network operators are reluctant to widely share geofencing information. Yet another issue is that network operators may inadvertently provide incorrect or stale geofencing information. These limitations affect user experience, and in turn, affect the usability and practicality of CBRS networks.

This disclosure describes methods and systems for self-learning geofences. In particular, the disclosed methods and systems generate geofencing information based on CBRS data points gathered by user devices. The generated geofencing information can be used by a user device in scenarios where the network provided information is non-existent or deficient.

As described in this disclosure, self-learning geofences involves user devices gathering data points indicative of CBRS networks, processing the gathered data points client-side, and providing the processed data points to a central server. The central server received the CBRS data points from one or more user devices and performs server-side processing of the received CBRS data points. For example, the central server can aggregate data points, remove weak data points, and create data point clusters that are indicative of geofencing areas of CBRS networks. Additionally, the central server can provide geofence data to a user device in response to a request from the user device. Furthermore, the disclosed methods and systems cache geofence data on a user device, e.g., routine-based geofence cache and a destination-based geofence cache. Additionally, the disclosed methods and systems include maintenance operations and modules for improving the quality of available geofence data.

In accordance with one aspect of the present disclosure, a method for self-learning geofences is disclosed. The method involves gathering a plurality of data points associated with one or more Citizens Broadband Radio Service (CBRS) deployers; determining respective identifiers of the one or more CBRS deployers associated with the plurality of data points; clustering, based on the respective identifiers of the one or more CBRS deployers, the plurality of data points into one or more clusters, where each cluster is associated with one of the one or more CBRS deployers, and where each cluster is associated with a geofence of a network of the one or more CBRS deployers; identifying an opportunity for uploading the one or more clusters to a central server; and uploading the one or more clusters to the central server during the identified opportunity.

Other versions include corresponding systems, apparatus, and computer programs to perform the actions of methods defined by instructions encoded on computer readable storage devices. These and other versions may optionally include one or more of the following features.

In some implementations, the plurality of data points are data points from at least one of baseband, global positioning system (GPS), Wi-Fi, or telephony processes of the user device.

In some implementations, the method further involves calculating a respective signal quality for each of the plurality of data points; and deleting a subset of data points that have a respective signal quality less than a predetermined threshold.

In some implementations, the respective signal quality is calculated based on one or more of Reference Signal Received Power (RSRP), Reference Signal Received Quality (RSRQ), Received Signal Strength Indicator (RSSI), Signal-to-noise ratio (SNR), and Signal-to-Interference-plus-Noise Ratio (SINR).

In some implementations, clustering, based on the respective identifiers of the one or more CBRS network deployers, the plurality of data points into one or more clusters involves for each data point: determining whether a center of a nearest cluster associated with the same CBRS deployer is less than a threshold distance away; if the center of the nearest cluster is less than or equal to the threshold distance away, adding the data point to the nearest cluster; and if the center of the nearest cluster is greater than the threshold distance, creating a new cluster with the data point as the center of the new cluster.

In some implementations, identifying an opportunity for uploading the one or more clusters to a central server involves identifying the opportunity based on a determination that the user device is plugged into power, that the user device is connected to Wi-Fi, and/or that the user device is idle.

In some implementations, uploading the one or more clusters to the central server during the identified opportunity involves uploading a threshold number of strongest data points in each cluster.

In some implementations, the method further involves generating a request for geofence data, where the request includes an approximate location of the user device, a list of requested CBRS deployers, and a requested geofence count; providing the request to the central server; and receiving, from the central server, self-learned geofence data associated with the list of requested CBRS deployers.

In some implementations, the method further involves using the self-learned geofence data to connect a CBRS network associated with one of the requested CBRS deployers.

In accordance with one aspect of the present disclosure, a method for dynamic server-side aggregation is disclosed. The method involves receiving, from a user device, a request for geofences associated with one or more networks, the request includes at least one of: network identifiers of the one or more networks, an approximate location of the user device, or a geofence count; identifying a set of geofences associated with the network identifiers; involves generating a circle around the approximate location on a map, where at least a subset of the set of geofences is encompassed within the circle; comparing the geofence count to a first number of geofences within the circle; and if the first number of geofences is equal to the geofence count, returning the subset of geofences within the circle and a radius of the circle to the user device.

Other versions include corresponding systems, apparatus, and computer programs to perform the actions of methods defined by instructions encoded on computer readable storage devices. These and other versions may optionally include one or more of the following features.

In some implementations, the method further involves if the first number of geofences is less than the geofence count: identifying a first geofence outside of the circle that has a center closest to the approximate location compared to other geofences outside of the circle; determining whether a second number of geofences in the circle would be less than or equal to the geofence count if the radius of the circle was expanded to the center of the first geofence; and if the second number of geofences would be greater than the geofence count, returning the subset of geofences within the circle and the radius of the circle to the user device.

In some implementations, the method further involves if the second number of geofences would be less than or equal to the geofence count, expanding the radius of the circle to the center of the first geofence.

In some implementations, the method further involves comparing the second number of geofences to the geofence count; and in response to determining that the second number of geofences is equal to the geofence count, returning a second subset of geofences within the expanded circle and the expanded radius to the user device.

In some implementations, the method further involves if the first number of geofences is greater than the geofence count: identifying a first geofence within the circle that has a center furthest from the approximate location of the user device compared to other geofences in the circle; determining if a distance between the center of the first geofence and the approximate location is greater than a predetermined minimum radius; and if the distance is less than or equal to the predetermined minimum radius, combining two geofences within the circle to create a new geofence that encompasses an area covered by the two geofences.

In some implementations, where there is a second number of geofences in the circle after combining the two geofences, and where the method further involves comparing the second number of geofences to the geofence count; and in response to determining that the second number of geofences is equal to the geofence count, returning a second subset of geofences within the circle and the radius of the circle to the user device.

In some implementations, the method further involves if the distance is greater than the predetermined minimum radius, shrinking the radius of the circle to a new radius based on the distance between the center of the first geofence and the approximate location.

In some implementations, where there is a second number of geofences in the circle after shrinking the radius, and where the method further involves comparing the second number of geofences to the geofence count; and in response to determining that the second number of geofences is equal to the geofence count, returning a second subset of geofences within the circle and the new radius of the circle to the user device.

Particular implementations of the methods and systems described in this specification can be implemented so as to realize one or more of the following advantages. As an example, the disclosed methods and systems find CBRS coverage autonomously. As another example, the disclosed methods and systems enable a quick response to updates in CBRS deployment (e.g., adding of a new CBRS network or updating an existing CBRS network). Additionally, the disclosed methods and systems do not depend on enterprises to provide accurate or timely geofence information.

The details of one or more implementations of the subject matter described in this disclosure are set forth in the accompanying drawings and the description. Other features, aspects, and advantages of the subject matter will become apparent from the description, the drawings, and the claims.

DESCRIPTION OF DRAWINGS

FIG. 3A, FIG. 3B, and FIG. 3C illustrate a workflow for self-learning geofence data, according to some implementations of the present disclosure.

DETAILED DESCRIPTION

This disclosure describes methods and systems for self-learning geofences. In one embodiment, self-learning geofences involves user devices gathering CBRS data points (e.g., data points that are indicative of CBRS networks). The user devices process the CBRS data points and upload the processed data points to a central server. The central server receives and aggregates the CBRS data points from the user devices. The central server then uses the aggregated CBRS data points to generate geofencing information for CBRS networks. The central server provides the geofence information to a user device in response to a request from the user device. The generated geofencing information can be used by the user device in scenarios where the network provided information is non-existent or deficient. Thus, the self-learned geofencing information can be used to supplement or replace network provided geofencing information.

Figure 1:
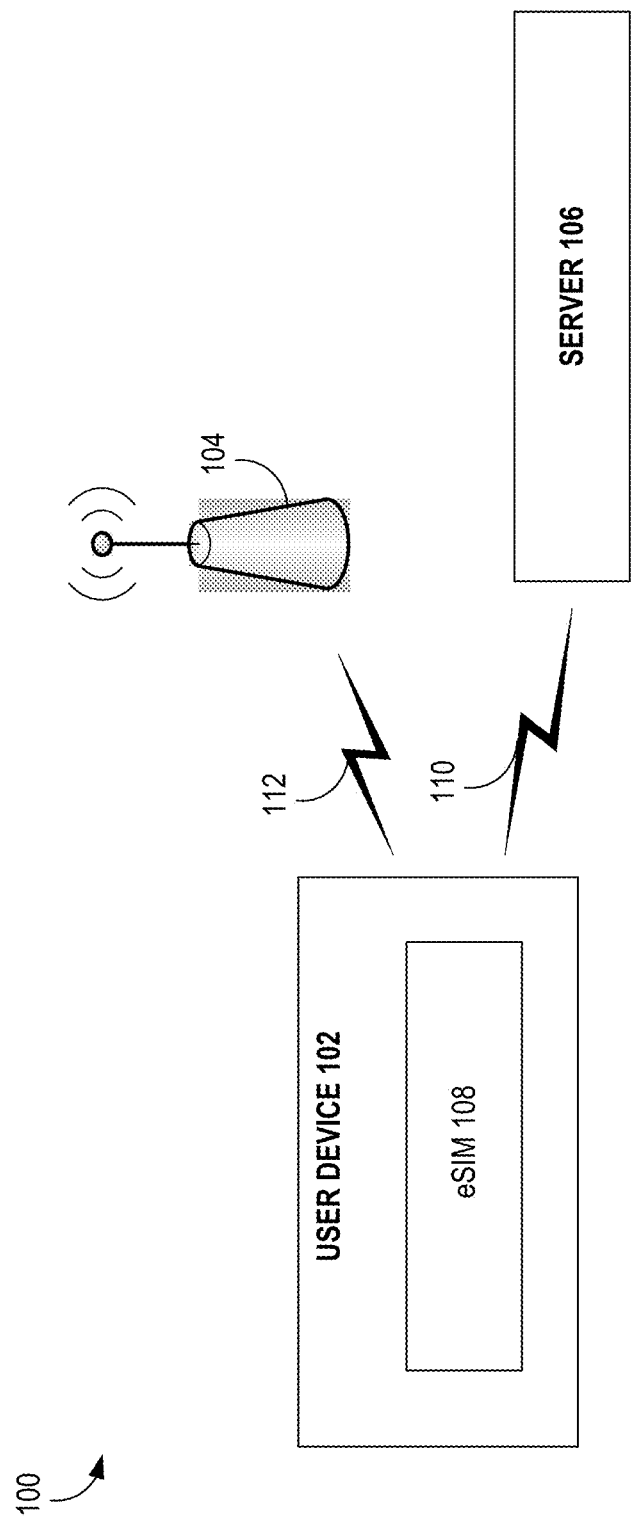
FIG. 1 illustrates an example CBRS network, according to some implementations of the present disclosure.

FIG. 1 illustrates an example CBRS network 100, according to some implementations. The CBRS network 100 includes a user device 102, a CBRS base station 104 (also referred to as a Citizens Broadband Radio Service Device [CBSD]), and a CBRS server 106. The user device 102 includes a main SIM associated with a main account, e.g. a commercial/major cellular network account. The user device 102 also includes an additional SIM, for example eSIM 108 that stores user credential information. The eSIM 108 is a SIM card that is embedded/integrated in the user device 102, for example, in the form of an integrated SIM chip that is not intended to be removed from the device. The eSIM 108 is also referred to as an embedded Universal Circuit Card (eUICC). The information on the eSIM 108 can be rewritten by network operators.

In some embodiments, the user device 102 can be configured to use its main SIM as the primary SIM, in which case the credentials associated with the main SIM are designated for use as the default for communications conducted by the device (e.g., cellular communications). However, the user device 102 may at any time designate either SIM (or any one of multiple SIMs in case the user device 102 is outfitted with more than two SIMS and/or eSIMs) as the primary SIM. Specifically, the user device 102 may switch to using the eSIM 108 as the primary SIM, in which case the credentials associated with the eSIM 108 become the default credentials for communications conducted by the device.

In some embodiments, the user device 102 may use the eSIM 108 to connect to a CBRS network, e.g., by connecting to the CBRS base station 104 via communication link 112. In these embodiments, the user device 102 may retrieve information indicative of geofencing area(s) representative of CBRS network(s) from the CBRS server 106, perhaps via a communication link 110. The CBRS server 106 can be an enterprise server or an entitlement server depending on whether the CBRS network 100 is an enterprise network or an MVNO network. The address of the CBRS server 106 may be provided to the user device 102 in the eSIM 108. The provisioning of the geofencing information may be used by user device 102 to discover and connect with CBRS cells, e.g., the CBRS base station 104. The geofencing information that is received from the CBRS server 106 can be network provided information and/or self-learned geofencing information.

Figure 2:
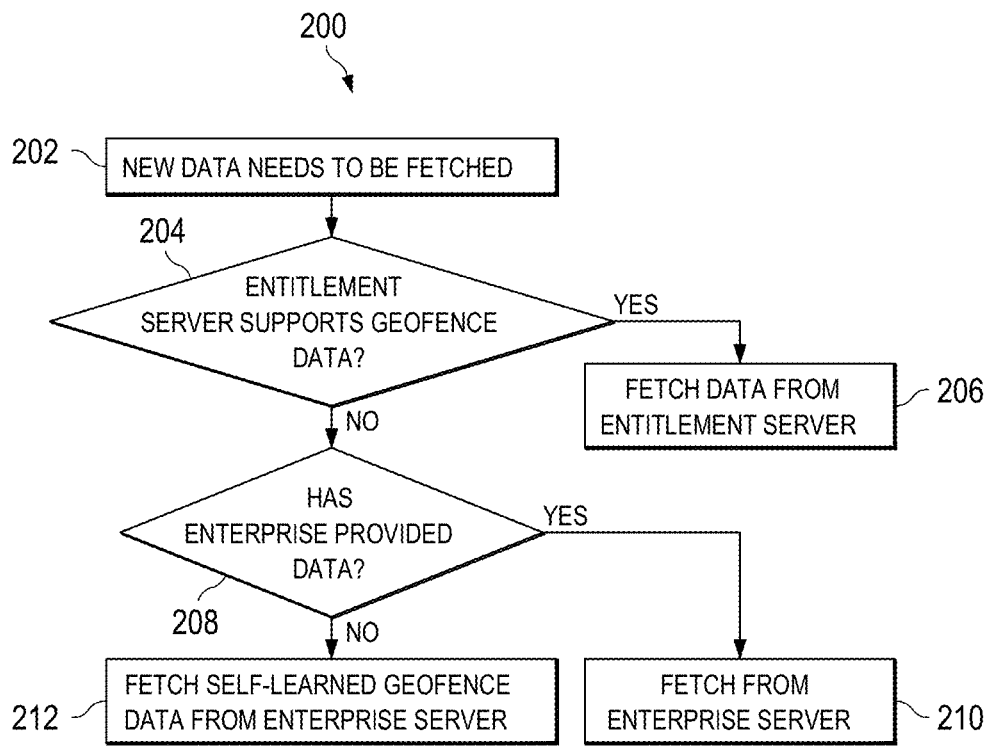
FIG. 2 illustrates a workflow for obtaining geofencing data, according to some implementations of the present disclosure.

FIG. 2 illustrates a workflow 200 for obtaining geofencing data, according to some implementations. The workflow 200 can be performed by a user device, e.g., the user device 102 of FIG. 1. The user device 102 can be configured to communicate with a carrier managed entitlement server and/or an enterprise server depending on the type of CBRS networks to which the user device 102 is configured to connect. More specifically, the user device 102 communicates with a carrier managed entitlement server when operating on an MVNO network, and communicates with an enterprise server when operating on an enterprise network.

At block 202, the user device 102 determines that new geofencing data needs to be fetched. The user device 102 can make the determination in response to a trigger, such as a threshold time elapsing since the last instance of fetching geofencing data, determining that the user device 102 has been configured with a new eSIM, or receiving an indication that the user device 102 is scheduled to use a CBRS network for which the device needs geofencing data (e.g., the geofencing data for the network is non-existent or stale).

At block 204, if the user device 102 is configured to operate on an MVNO network, the device determines whether the entitlement server of the MVNO network supports geofencing data. If the entitlement server supports geofencing data, the user device 102 moves to block 206, where the device fetches geofencing data from the entitlement server. If the entitlement server does not support geofencing data or if the user device 102 is operating on an enterprise network, the device moves to block 208. At block 208, the user device 102 determines if the enterprise has provided geofencing data. If the enterprise has provided geofencing data, the user device 102 moves to block 210, where the device fetches geofencing data from the enterprise server. If the enterprise has not provided geofencing data, the user device 102 moves to block 212. At block 212, the user device 102 fetches self-learned geofence data from the enterprise server.

FIG. 3A, FIG. 3B, and FIG. 3C illustrate a workflow 300 for self-learning geofence data, according to some implementations. Generally, the workflow 300 involves gathering data points that can be used for self-learning geofences. These data points, also referred to as CBRS data points, include any device-side data that is indicative of a CBRS network. The workflow 300 also involves processing the gathered CBRS data points (e.g., filtering and/or aggregating the data points) to generate clusters of data points indicative of geofences. Additionally, the workflow 300 involves providing the self-learned geofences to a user device, e.g., in response to a request from the user device. The steps of the workflow 300 may be performed by a user device 340 or a server 342. Operations performed by the user device 340 (or a subsystem thereof) are referred to as "client-side" or "device-side" operations. And operations performed by the server 342 (or a subsystem thereof) are referred to as "server-side" operations. The user device 340 includes a baseband module 344, a GPS module 346, a Wi-Fi module 348, a Telephony module 350, a CBRS controller 352, a data harvester 354, and a GeoServices client 356. The server 342 includes a harvesting server 358 and a geofence server 360.

As shown in FIG. 3A, FIG. 3B, and FIG. 3C, the workflow 300 includes several sub-workflows. Steps 302-312 are associated with a client-side aggregation workflow 330, steps 314-316 are associated with a static server-side aggregation workflow 332, and steps 318-328 are associated with a dynamic server-side aggregation workflow 334. The client-side aggregation workflow 330 involves gathering data points, processing data points (e.g., aggregating data points), and uploading data points to the server 342. Because the client-side aggregation workflow 330 involves uploading data points to the server 342, the workflow 330 is also referred to as a "data upload pipeline." The static server-side aggregation workflow 332 involves processing data points received from the user device 340. And the dynamic server-side aggregation workflow 334 involves the server 342 providing the user device 340 with geofence data, perhaps in response to a request from the user device 340. Because the dynamic server-side aggregation workflow 334 involves the user device 340 downloading data from the server 342, the workflow 334 is also referred to as a "data download pipeline."

The client-side aggregation workflow 330 involves gathering data points at the client-side. In particular, the data harvester 354 is configured to gather CBRS data points by passively observing processes or operations of the user device 340. Example processes include baseband processes, GPS processes, Wi-Fi processes, telephony processes, among other processes. In the workflow 330, the data harvester 354 gathers the CBRS data points in steps 302-308. At step 302, the data harvester 354 gathers baseband data (e.g., Reference Signal Received Power (RSRP), Reference Signal Received Quality (RSRQ), etc.), for example, by communicating with or observing the processes of baseband module 344. At step 304, the data harvester 354 gathers GPS data (e.g., satellite positioning data, etc.), for example, by communicating with or observing the processes of GPS module 346. At step 306, the data harvester 354 gathers Wi-Fi data (Service Set Identifier [SSID], RSRP, etc.), for example, by communicating with or observing the processes of Wi-Fi module 348. At step 308, the data harvester 354 gathers telephony data (e.g., public land mobile network [PLMN] information, CBRS Network Identifier [NID], etc.), for example, by communicating with or observing the processes of Telephony module 350. Note that steps 302-208 may be performed simultaneously or sequentially. Additionally, the data harvester 354 may communicate with other modules of the user device 340.

The client-side aggregation workflow 330 also involves processing the gathered data points at step 310. In particular, the data harvester 354 may process the gathered data points prior to sending the data points to the server 342. Doing so allows the user device 340 to limit the amount of data uploaded to the server 342, thereby preserving system resources (e.g., system power, computing resources, and communication resources). In one example, the data harvester 354 processes the data points to remove data points that have weak signal quality (e.g., data points that are associated with sporadic or unstable connections). The data harvester 354 can assess signal quality based on a weighted combination of one or more metrics, including RSRP, RSRQ, Received Signal Strength Indicator (RSSI), Signal-to-noise ratio (SNR), and Signal-to-Interference-plus-Noise Ratio (SINR). Other metrics are also possible. The data harvester 354 can then remove data points that do not have a threshold signal quality.

Additionally, the data harvester 354 can organize the data points into clusters, e.g., based on the deployer that is associated with the data points. Thus, data points that are associated with the same deployer (e.g., same cell or CBRS network) are clustered. In some examples, the data harvester 354 clusters data points that share the same deployer and that are within a threshold distance to one another. In these examples, a single CBRS network may have multiple clusters of data points. Note that a deployer is identified based on a unique ID associated with the deployer. Enterprise networks or deployers are identified by a shared PLMN 315-010 and a unique NID. And MVNOs are identified by a PLMN other than 315-010 and a unique GID.

At step 312, the client-side aggregation workflow 330 involves providing CBRS data points to the server 342. In some embodiments, the data harvester 354 filters the CBRS data points before reporting the data to the server 342. Thus, the data harvester 354 can report data points that satisfy certain conditions. As an example, the data harvester 354 can filter out clusters that have too few data points, e.g., less than a predetermined threshold. As another example, the data harvester 354 can filter out the weakest points of a particular cluster. Thus, the data harvester 354 only reports a threshold number of the strongest data points in the cluster. The strongest points are more likely to be closer to the base station, and therefore, provide a better indicator of the center of a geofence generated by the server 342 (as described in more detail below). As yet another example, the data harvester 354 can filter out data points that do not have a threshold signal quality. Furthermore, the data harvester 354 may filter out cells or networks where geofences cannot be effectively utilized. Examples of where geofences cannot be effectively utilized include networks with mobile CBSDs (e.g., installed on a vehicle).

Figure 6:
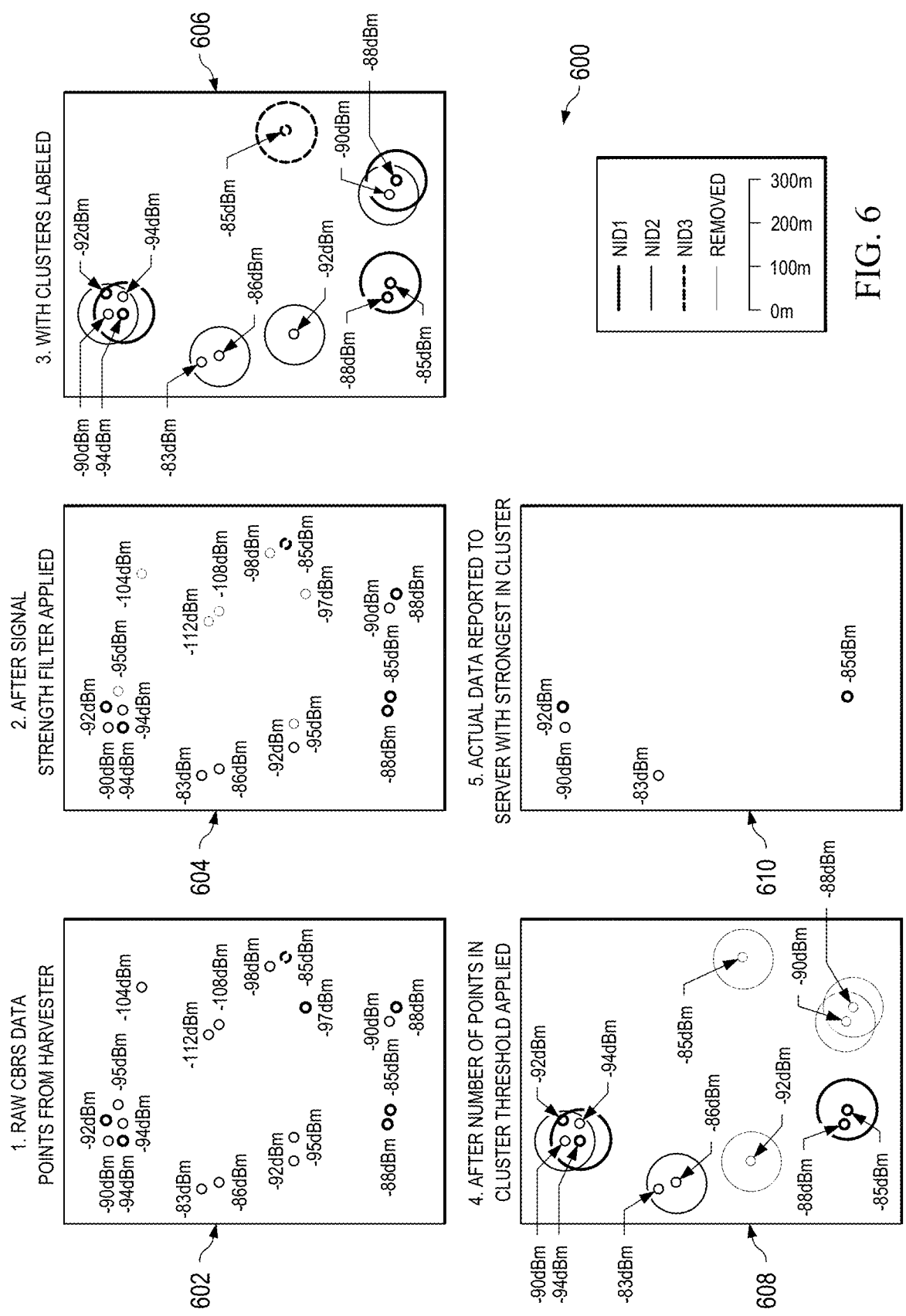
FIG. 6 illustrates an example of client-side aggregation, according to some implementations of the present disclosure.

In some embodiments, the data harvester 354 is configured to report the data points to the server 342 under certain conditions. For example, the data harvester 354 can be configured to report the data when the user device 340 is plugged into power (thereby decreasing the chances of interruption due to a power outage), when the user device 340 is connected to Wi-Fi (thereby decreasing the cost of the transmission), and/or when the user device 340 is idle (thereby not interrupting other device processes). As shown in FIG. 3C, the harvesting server 358 of the server 342 receives the data from the data harvester 354. An example of client-side aggregation is shown in FIG. 6.

Figure 8:
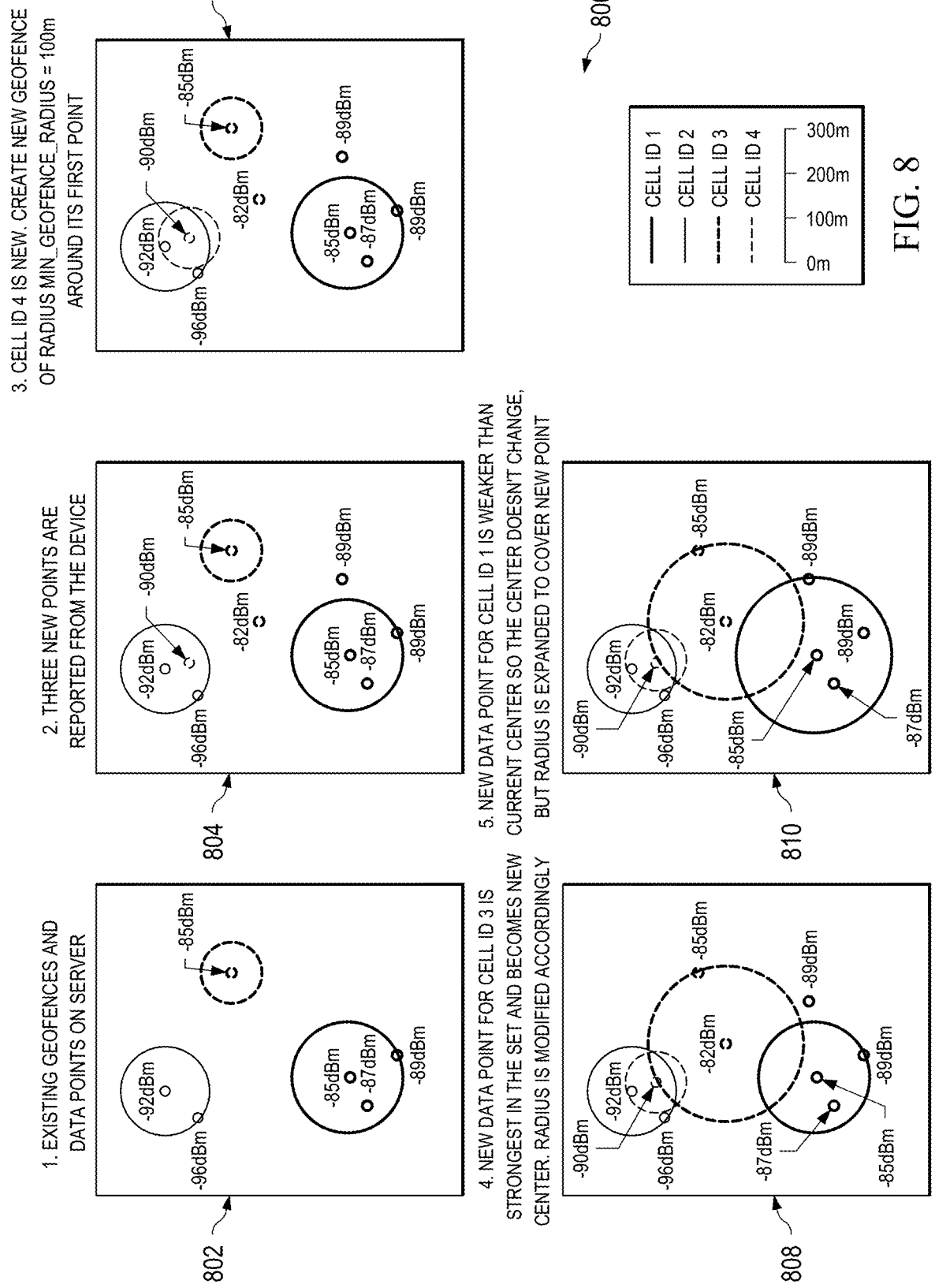
FIG. 8 illustrates an example of static server-side aggregation, according to some implementations of the present disclosure.

The static server-side aggregation workflow 332 is a server-side workflow that starts at step 314. At step 314, the static server-side aggregation workflow 332 involves processing the data points received from the user device 340. In particular, the harvesting server 358, which receives the data from the user device 340, processes the data, e.g., to reduce the number of geofences. Doing so optimizes the dynamic aggregation process described below. In one example, the harvesting server 358 aggregates geofences statically to reduce the number of geofences. In this example, the harvesting server 358 aggregates geofences of the same cell ID (e.g., the same NID or the same GID). More specifically, as more data points are gathered for a particular geofence, the harvesting server 358 designates the strongest data point of the geofence as the center of that geofence. Additionally, the harvesting server 358 adjusts the radius of the geofence changes to cover all reported data points of the corresponding cell. The radius changes over time to improve accuracy of geofence coverage while making sure to cover all previous points. An example of static server-side aggregation is shown in FIG. 8. The data aggregated in the static server-side aggregation workflow 332 is used in the dynamic server-side aggregation workflow 334.

The dynamic server-side aggregation workflow 334 involves the server 342 providing the user device 340 with geofence data, perhaps in response to a request from the user device. As shown in FIG. 3B, the CBRS controller 352 sends a request to the GeoServices client 356 at step 318. The request includes the device's approximate location, a list of requested NIDs, and a geofence limit. The list of requested NIDs includes the NIDs for CBRS networks that the user device 340 is currently using or will be using. The geofence limit is a maximum number of geofences that the user device 340 is requesting. This is needed because the location module of the user device 340 may have a limit on the number of geofences a process can set at once.

At step 320, the GeoServices client 356 applies dynamic endpoint switching to forward the request to the appropriate geofence server endpoint depending on the device's geographic region. In this example, the GeoServices client 356 at step 322 sends a request for geofences to the server 342. The appropriate geofence server, e.g., geofence server 360, receives the request and uses the device's approximate location, the list of requested NIDs, and/or the geofence limit to apply dynamic server-side aggregation at step 324. The dynamic server-side aggregation uses the request to select geofences stored in the server 342 to provide the user device 340. The dynamic server-side aggregation workflow is explained in more detail below. The geofence server 360 returns to the user device 340, in particular the GeoServices client 356, a list of geofences at step 326. The GeoServices client 356 provides the list of geofences to the CBRS controller 352 at step 328. The CBRS controller 352 can then use the geofence data to connect to one or more CBRS networks.

In some embodiments, dynamic server-side aggregation involves the geofence server 360 analyzing the device's request at runtime to select geofences stored in the server 342 to return to the device. In one example, the geofence server 360 draws an initial proximity radius around the device's approximate location to select an initial set of geofences. The geofence server 360 then adjusts, e.g., increases or decreases, the proximity radius based on the requested geofence count. In scenarios where the initial proximity radius has fewer geofences than the requested geofence count, the geofence server 360 increases the proximity radius, perhaps using predetermined intervals, until the proximity radius includes the requested geofence count. And in scenarios where the initial proximity radius has more geofences than the requested geofence count, the geofence server 360 decreases the proximity radius, perhaps using predetermined intervals, until the proximity radius includes the requested geofence count.

In some examples, the proximity radius may have a minimum size. The minimum size prevents the proximity radius from being shrunk too much because shrinking the proximity radius too much can result in frequent fetch requests from the device to the server. Accordingly, if the geofence server 360 decreases the proximity radius to reach the minimum size, but the number of geofences is still greater than the number of the requested geofence count, the server reduces the number of geofences in the minimum proximity radius. The geofence server 360 can combine nearby geofences of the same deployer to match the requested geofence count. The set of geofences is returned when it is reduced to no more than the geofence limit sent by the device in the request. In scenarios where not enough geofences are present to complete a step or an algorithm, the geofence server 360 returns the available set of geofences even if it is less than the requested number of geofences.

Figure 4A:
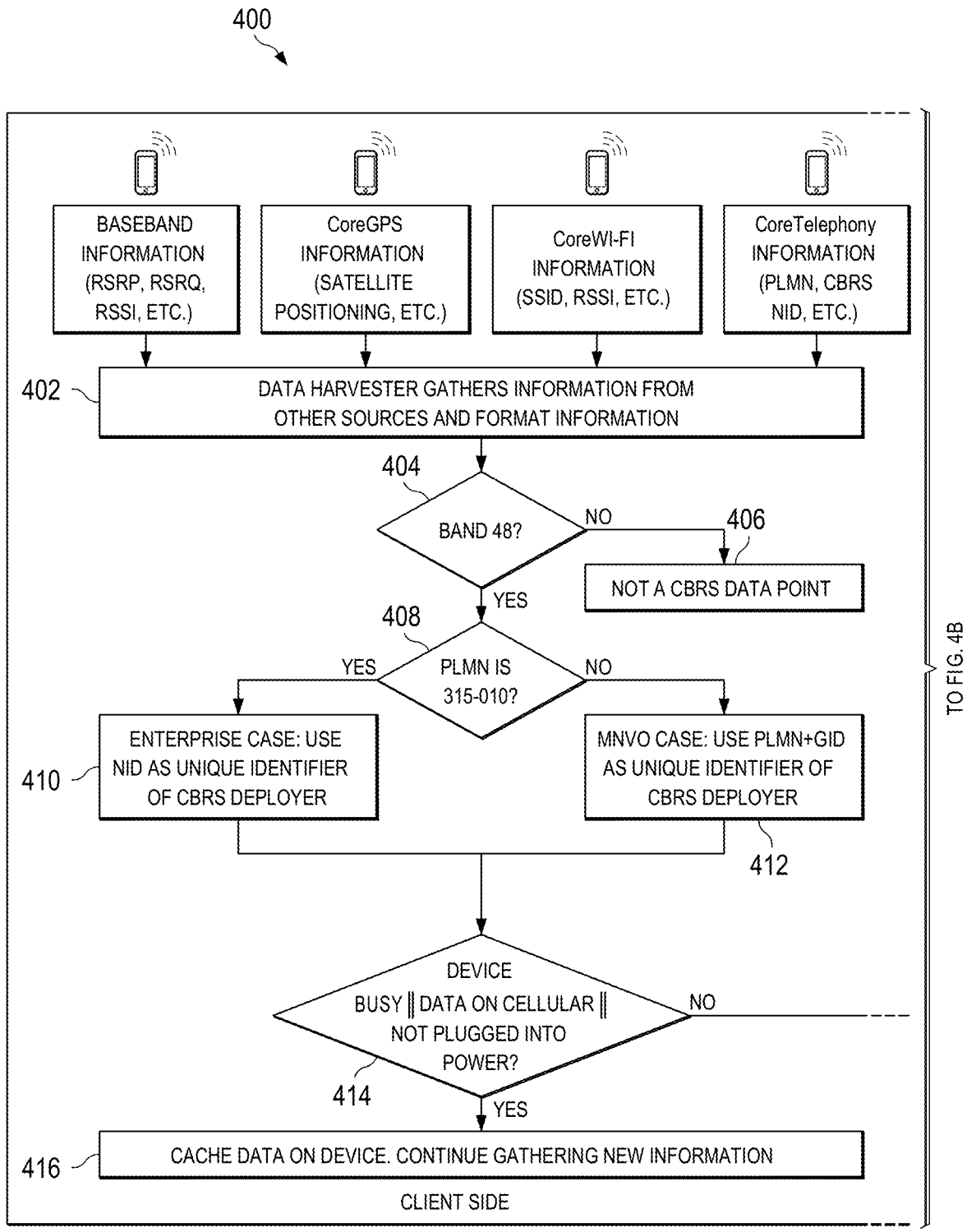
FIG. 4A and FIG. 4B illustrate an example upload/download flowchart, according to some implementations of the present disclosure.
Figure 4B:
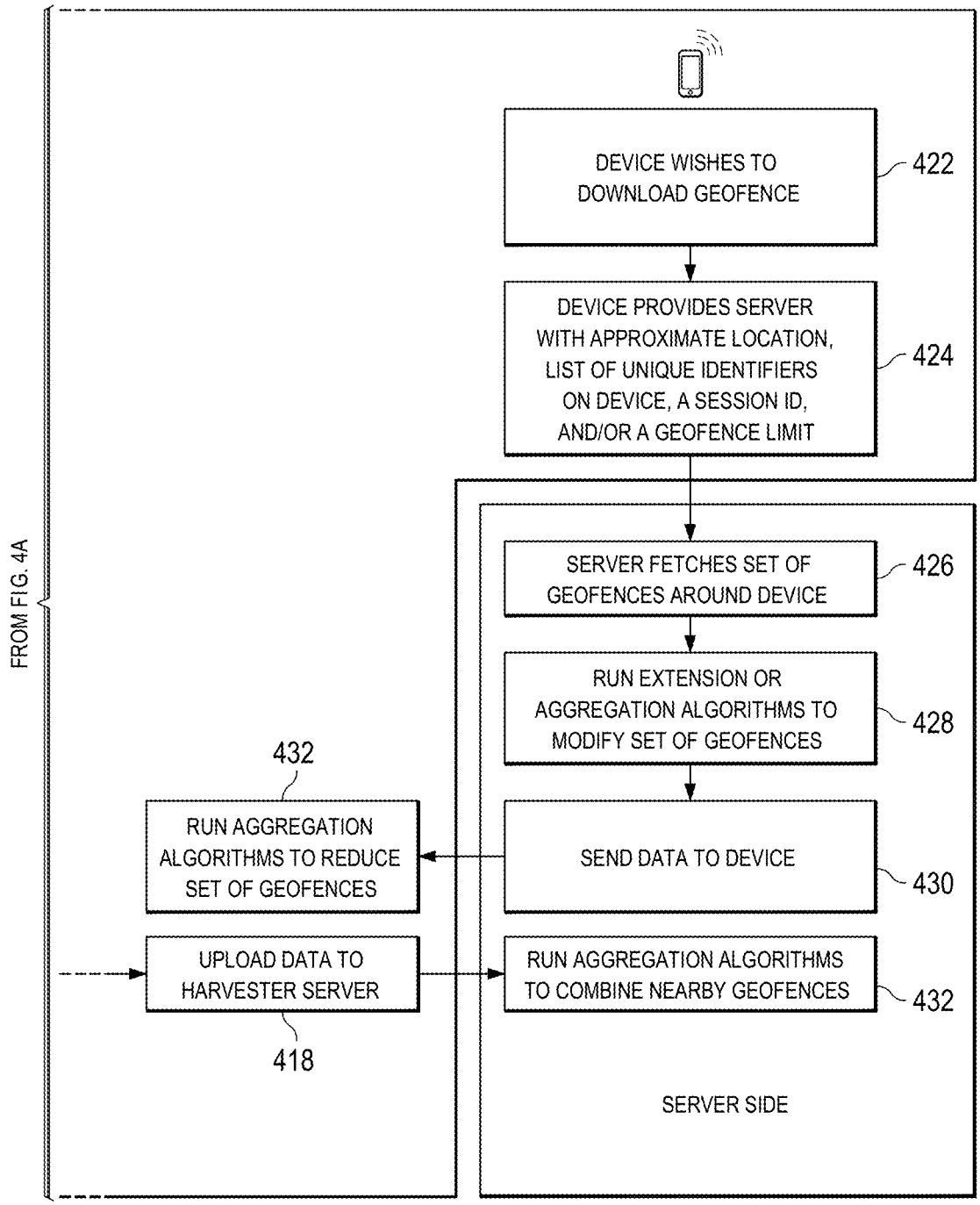

FIG. 4A and FIG. 4B illustrate an example upload/download flowchart 400, according to some implementations. As explained previously, a user device can upload data (e.g., CBRS data points) to a server, and download data (e.g., self-learned geofences) from a server. The flowchart 400 includes steps for uploading to and/or downloading data from a server. As shown in FIG. 4A and FIG. 4B, some steps of the flowchart 400 are performed client-side and other steps are performed server-side.

The workflow for uploading data to the server start at block 402. At block 402, a data harvester gathers client-side information that can be used to generate CBRS data points. Each CBRS data point is indicative of a connection to a CBRS network, and includes a geographic location and a measure of signal quality to the CBRS network. The signal quality can be generated based on a weighted combination of one or more metrics of the connection to the CBRS network, including RSRP, RSRQ, RSSI, SNR, and/or SINR. At block 402, the data harvester also formats the gathered information, e.g., into a specific format (e.g., Protobuf).

At block 404, the data harvester determines if the data points are associated with Band 48. If a data point is not associated with Band 48, the data harvester determines that the data point is not a CBRS data point, as shown by block 406. Conversely, if a data point is associated with Band 48, the data harvester then determines if the PLMN of the data point is 315-010 at block 408. If the PLMN of the data point is 315-010, the data harvester determines that the data point is associated with an enterprise network at block 410. Accordingly, the data harvester uses the NID as a unique identifier of the CBRS deployer. Conversely, if the PLMN of the data point is not 315-010, the data harvester determines that the data point is associated with an MVNO network at block 412. In this case, the data harvester uses the PLMN and GID as a unique identifier of the CBRS deployer.

The data harvester then moves to block 414 where the data harvester determines: (i) if the device is busy (e.g., is the device performing other processes), (ii) if the device data is operating on cellular networks, and/or (iii) if the device not plugged into power. If the answer is yes to these inquiries, the data harvester moves to block 416, where the data harvester caches the data on the device and continues gathering new data. Conversely, if the answer is no to at least one of these inquiries, the data harvester moves to block 418, where the data harvester uploads the data to the harvester server. At block 420, the harvester servers runs one or more aggregation algorithms to combine nearby geofences. This step completes the data upload workflow.

The download workflow starts at block 422. At block 422, the user device determines to download geofence data. At block 424, the user device generates a request that includes an approximate location of the user device, a list of unique identifiers of one or more CBRS networks that are stored on the device, a session ID, and/or a geofence limit that specifies a maximum number of geofences to be downloaded from the server. The user device applies dynamic endpoint switching to forward the request to the appropriate geofence server endpoint depending on the device's geographic region. At block 426, the server fetches a set of geofences in proximity of the device. At block 428, the server runs extension or aggregation algorithms to modify the set of geofences. At block 430, the server sends the processed set of geofences to the user device. At block 432, the user device can also run aggregation algorithms to reduce the number of geofences included in the downloaded set. This step completes the data download workflow.

Figure 5A:
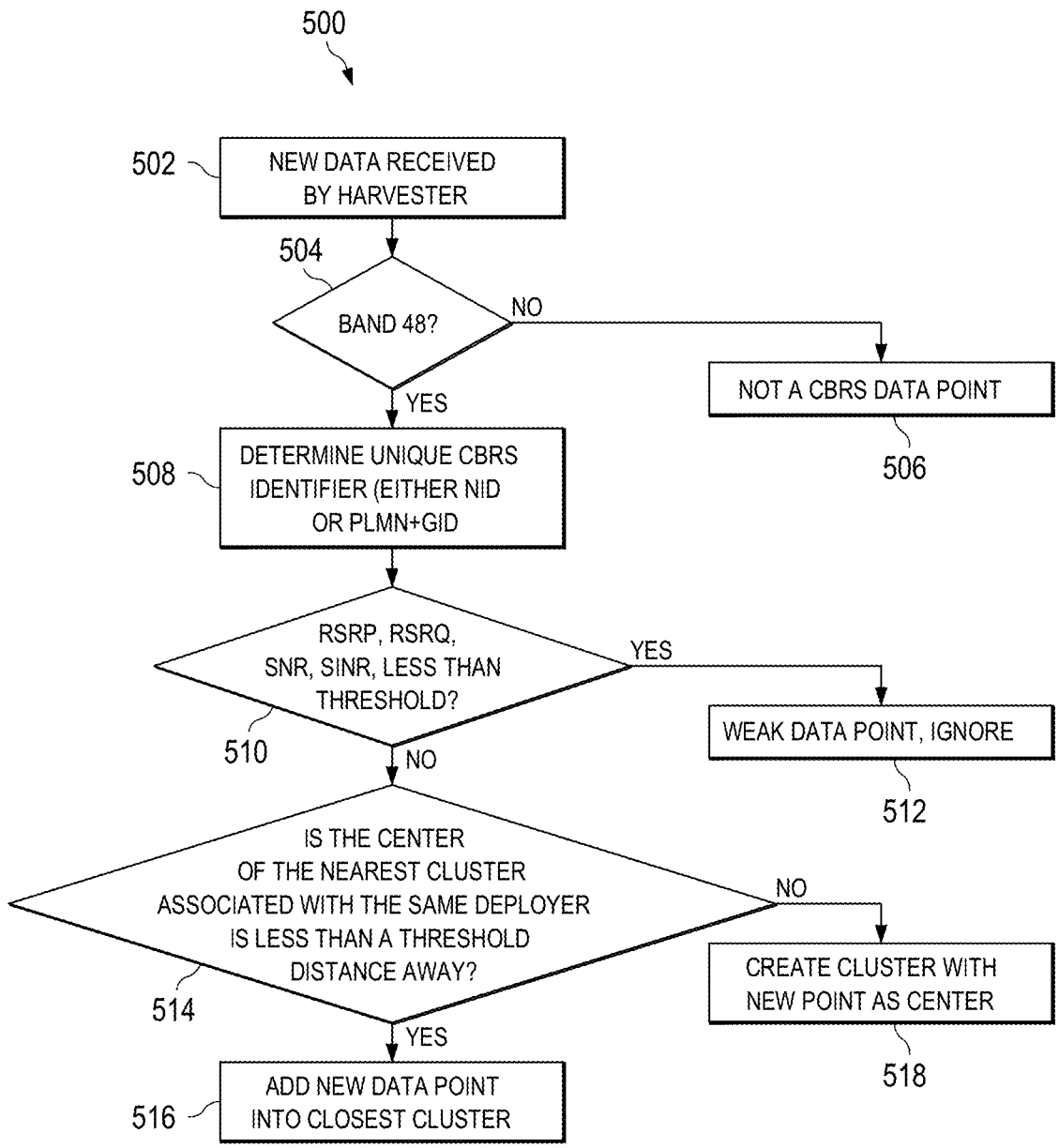
FIG. 5A and FIG. 5B illustrate a client-side aggregation workflow, according to some implementations of the present disclosure.
Figure 5B:
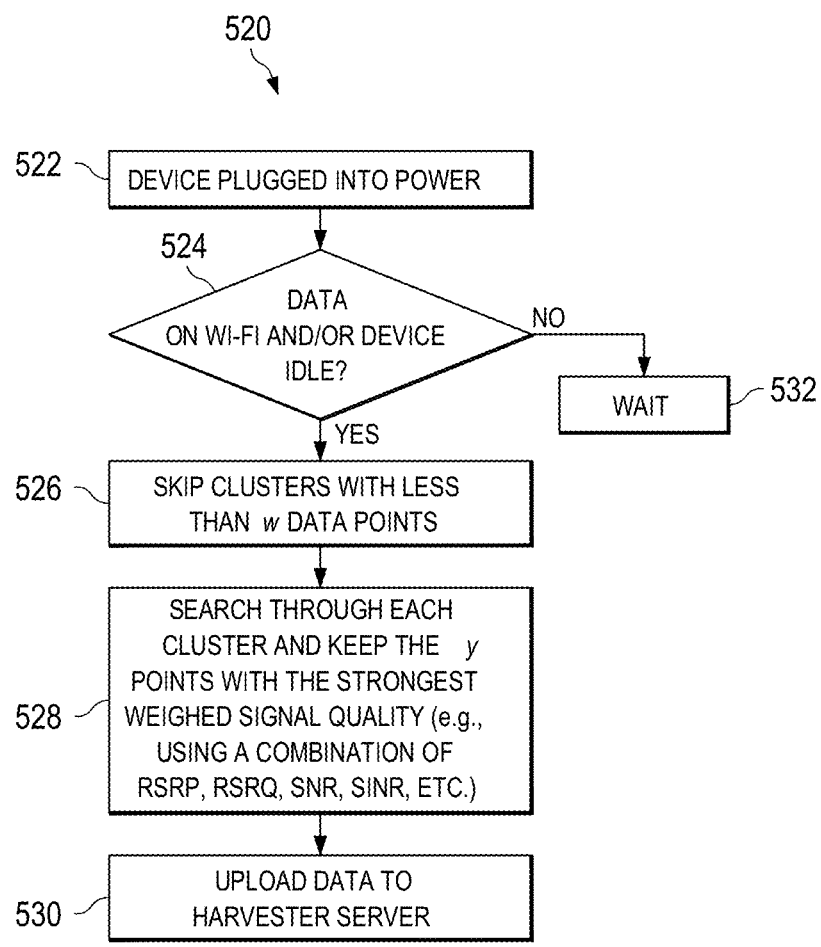

FIG. 5A and FIG. 5B illustrate a client-side aggregation workflow, according to some implementations. In particular, FIG. 5A illustrates a workflow 500 for processing CBRS data points, and FIG. 5B illustrates a workflow 520 for uploading the processed CBRS data points to a server.

Turning to FIG. 5A, at block 502, a data harvester of a user device gathers new CBRS data points, e.g., from baseband processes, GPS processes, Wi-Fi processes, telephony processes, among other processes. At block 504, the data harvester determines if the data is associated with Band 48. If the data is not associated with Band 48, the data harvester determines that the data is not a CBRS data point at block 506. Conversely, if the data is associated with Band 48, the data harvester moves to block 508. At block 508, the data harvester determines a unique identifier associated with the data. The unique identifier can be an NID (if an enterprise network) or a PLMN+GID (if an MVNO network).

At block 510, the data harvester determines if RSRP, RSRQ, SNR, SINR of the CBRS data point is less than a predetermined threshold. In one example, the harvester calculates a weighted combination of the metrics and compares the weighted combination to the predetermined threshold. If the weighted combination is less than the predetermined threshold, the data harvester, at block 512, determines to discard the data point because the data point is weak. Conversely, if the weighted combination is greater than or equal to the predetermined threshold, the data harvester moves to block 514. At block 514, the data harvester determines whether the center of the nearest cluster associated with the same deployer is less than a threshold distance away. If the center of the nearest cluster is less than or equal to the threshold distance away, the data harvester at block 516 adds the new data point to that nearest cluster. Conversely, the data harvester creates a new cluster with the new point as the center of the cluster at block 518.

Turning to FIG. 5B, at block 522, the data harvester determines that the user device has been plugged into power. At block 524, the data harvester determines if the data is on Wi-Fi and/or if the device is idle. If the device is not idle or if the data is not on Wi-Fi, the data harvester waits for a period of time before reattempting workflow 520, as shown by block 532. Conversely, if the device is idle and the data is on Wi-Fi, the data harvester moves to block 526. At block 526, the data harvester determines not to report clusters that have less than a predetermined threshold number of data points. At block 528, the data harvester searches through each cluster and keeps the y points with the strongest weighed signal quality (e.g., using a combination of RSRP, RSRQ, SNR, SINR, etc.) in each cluster. At block 530, the data harvester uploads the clusters with the remaining data points.

FIG. 6 illustrates an example 600 of client-side aggregation, according to some implementations. As explained previously, the client-side aggregation can be performed by a data harvester of a user device. In a first step of client-side aggregation, the data harvester gathers raw CBRS data points. The gathered data points are shown in window 602. As shown in window 602, each CBRS data point is assigned a visual property (e.g., color, shading, or line dashes) indicative of the deployer with which the data point is associated. As such, data points associated with the same deployer are assigned the same visual property. In example 600, the gathered CBRS data points are associated with three deployers (represented by their unique identifiers: NID 1, NID 2, and NID 3). Additionally, the position of each data point in the window 602 is indicative of a geographic location at which the user device recorded the data point. Furthermore, a signal strength (e.g., in decibels [dBm]) is calculated for each data point. The signal strength can be calculated using one or more of RSRP, RSRQ, SNR, and SINR.

In a second step of client-side aggregation, the data harvester applies a signal strength filter to the gathered CBRS data points. In this example, the signal strength filter filters CBRS data points that have a signal strength less than or equal to −95 dBm. Thus, as shown in window 604, CBRS data points that have a signal strength less than or equal to −95 dBm are removed from the data set. In a third step of client-side aggregation, the data harvester clusters the CBRS data points into one or more clusters based on the deployer. In particular, the data harvester clusters data points that share the same deployer and that are within a cluster distance threshold to one another. In example 600, the cluster distance threshold is 100 meters (m). As shown in window 606, the data harvester clusters the CBRS data points into eight clusters.

In a fourth step of client-side aggregation, the data harvester removes clusters that do not have a threshold number of points. In example 600, the threshold number of points is two. Accordingly, the data harvester removes clusters that do not have at least two points. As shown in window 608, the data harvester removes four clusters that do not have at least two points. In a fifth step of client-side aggregation, the data harvester reports to the server the strongest CBRS data points in each cluster. Thus, as shown in window 610, the data harvester reports four CBRS data points to the server. The report can include the NID of the deployer corresponding to each data point, the signal strength of each data point, and/or the geographic location of each data point.

Figure 7:
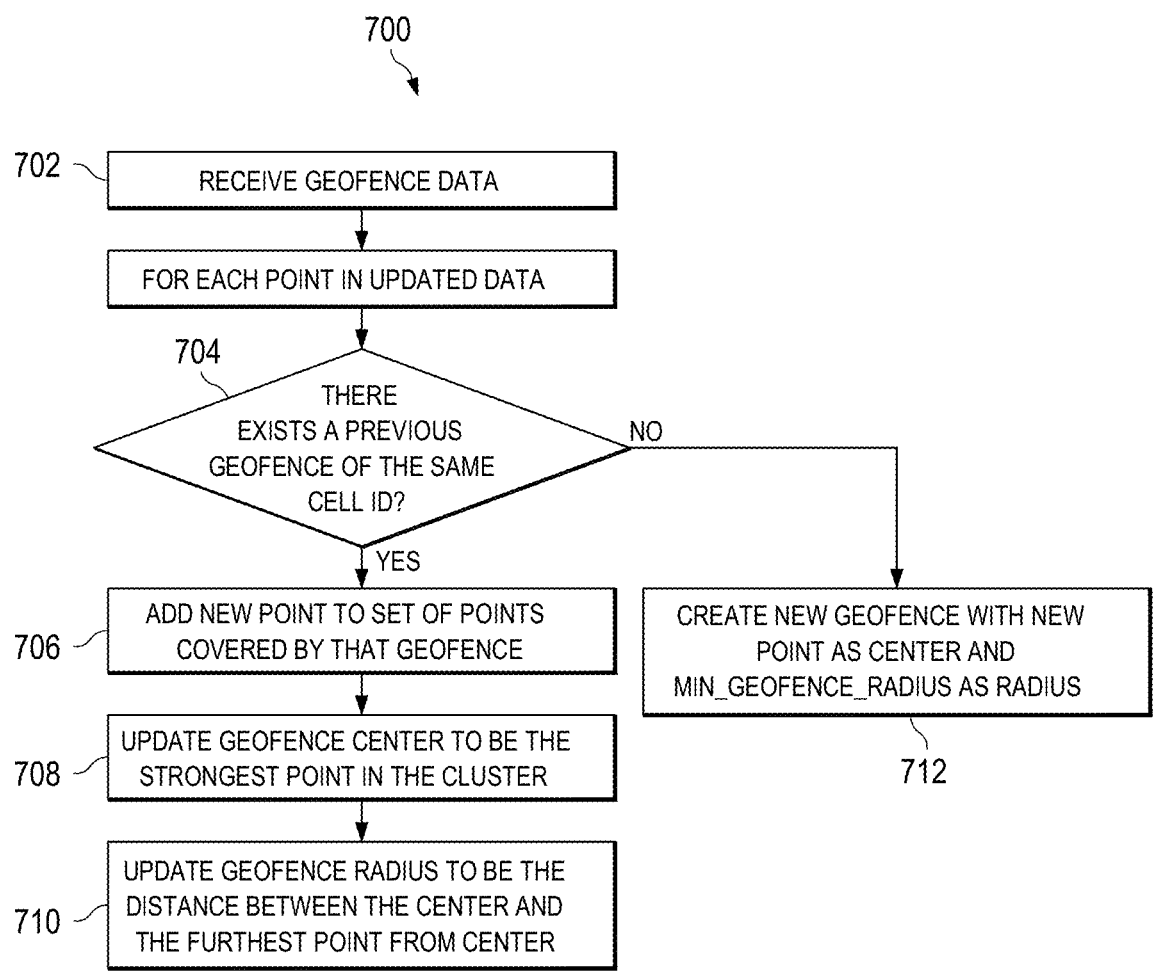
FIG. 7 illustrates a static server-side aggregation workflow, according to some implementations of the present disclosure.

FIG. 7 illustrates a static server-side aggregation workflow 700, according to some implementations. As explained previously, static server-side aggregation can be performed by a server. At block 702, the server receives new geofence data from a user device and fetches existing geofence data stored in the server. The server then performs the following steps for each data point in the new geofence data. At block 704, the server determines if there exists a previous geofence associated with the same cell ID as the new data point.

If a previous geofence of the same cell ID exists, the server moves to block 706. At block 706, the server determines to add the new point to the set of data points covered by that geofence. At block 708, the server updates the geofence center to be the strongest point in the cluster. More specifically, if the new data point is the strongest point in the cluster, the server designates the new data point as the geofence center. However, if the new data point is not the strongest point, then the geofence center remains unchanged. At block 710, the server updates the geofence radius to be the distance between the center and the furthest point from the center. For example, if the new data point is not designated as the geofence center and the new data point is the farthest point from the center, the geofence radius is extended to encompass the new data point. Returning to block 704, a previous geofence of the same cell ID does not exist for the new data point, the server moves to block 712. At block 712, the server creates a new geofence that has the new point as the geofence center and a predetermined minimum geofence radius as the geofence radius.

FIG. 8 illustrates an example 800 of static server-side aggregation, according to some implementations. Window 802 shows the existing geofences and the associated data points that are stored on the server. The data points are associated with three cell IDs: Cell ID 1, Cell ID 2, and Cell ID 3. In a first step of static server-side aggregation, the server receives new data points from a user device. In example 800, the server receives three new data points. As shown in window 804, two of the new data points are associated with existing cells, and one of the new data points is associated with a new cell, represented by cell ID 4. In a second step of static server-side aggregation, the server determines if the new data points include a data point that is associated with a new cell ID. If so, the server creates a new geofence that has the new data point as its center and a minimum geofence radius as its radius. As shown in window 806, a new geofence is generated for the new data point associated with cell ID 4.

In a third step of static server-side aggregation, the server adds the new points that are associated with existing cell IDs to the geofences associated with those cell IDs. The server then updates the geofence center if necessary. The geofence center is updated to be the new point if the new point is the strongest point in the geofence. The server then updates the geofence radius if necessary. In particular, the geofence radius is updated to be the distance between the center and the further point from the center. In example 800, the new data point for cell ID 3 is the strongest data point in the cluster. As shown in window 808, the new data point is designated as the geofence center, and the geofence radius is adjusted accordingly. Additionally, the new data point for cell ID 1 is weaker than the current data point designated as the geofence center. Thus, as shown in window 810, the center of the geofence associated with cell ID 1 does not change. However, because the new data point is outside the original radius of the geofence, the radius is increased to encompass the new data point, as also shown in window 810. The updated data sets are stored on the server, and can be used by the server in a dynamic server-side aggregation workflow that provides geofences to user devices.

Figure 9A:
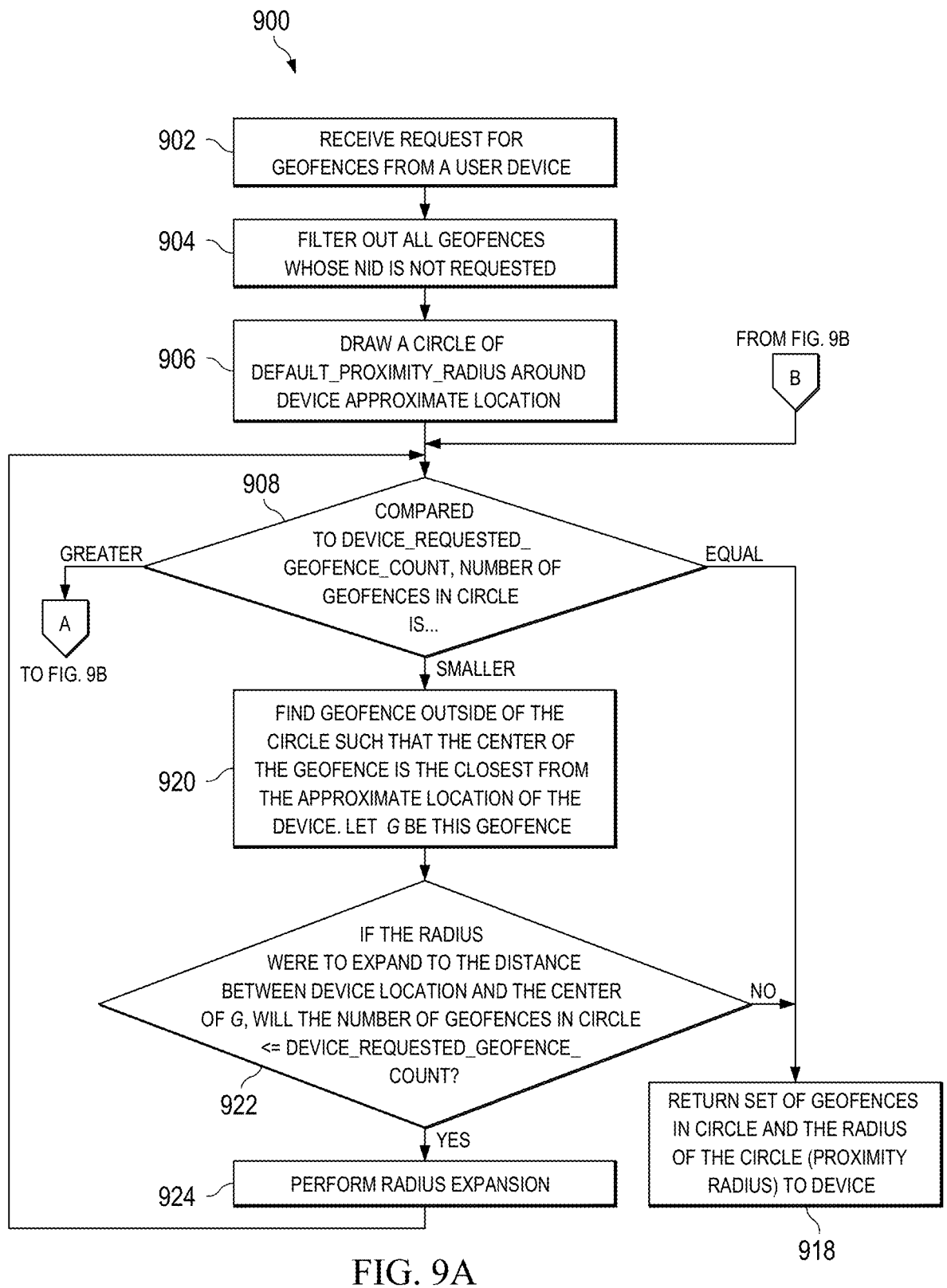
FIG. 9A and FIG. 9B illustrate a dynamic server-side aggregation workflow, according to some implementations of the present disclosure.
Figure 9B:
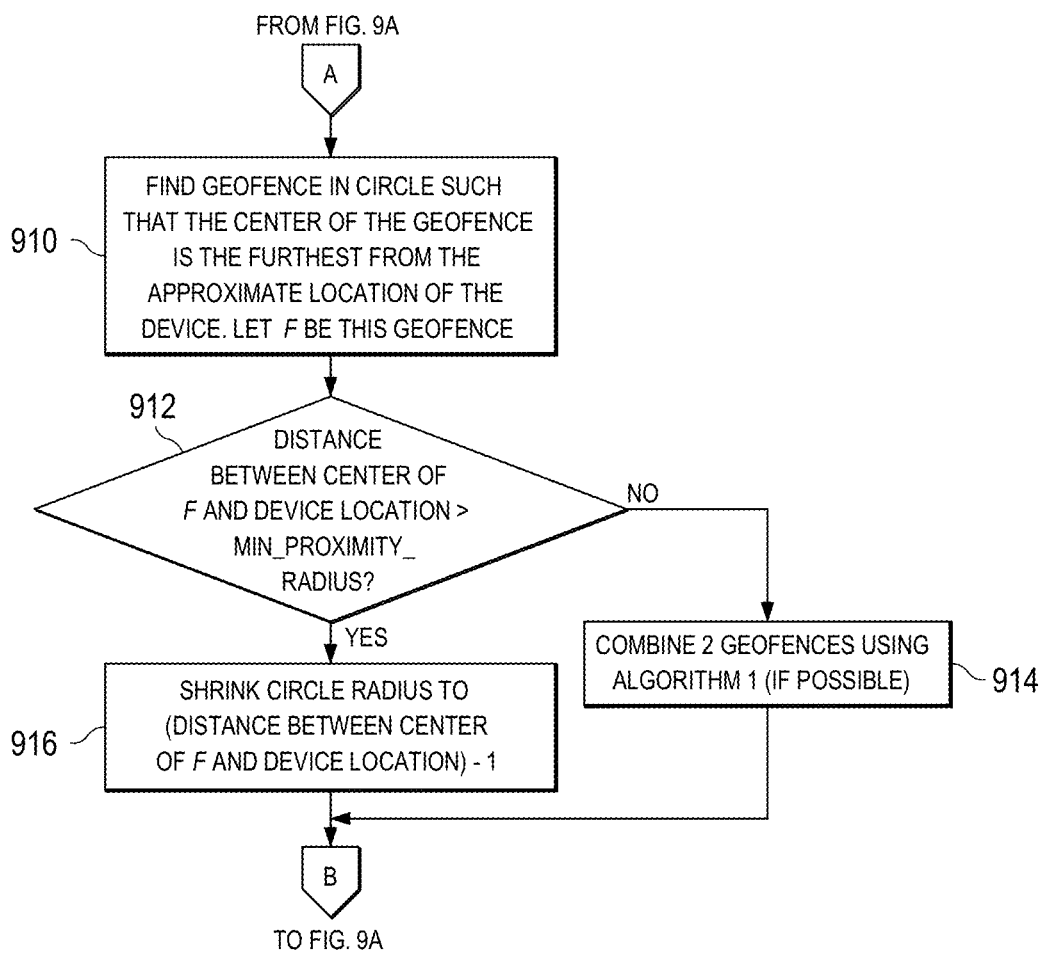

FIG. 9A and FIG. 9B illustrate a dynamic server-side aggregation workflow 900, according to some implementations. As explained previously, dynamic server-side aggregation can be performed by a server. At block 902, the server receives a request for geofences from a user device. The request can include the user device's approximate location, a list of requested deployer identifiers, and a geofence limit. At block 904, the server filters all geofences associated with NIDs that are not included in the request.

At block 906, the server generates a circle around the device's approximate location. This circle has a default or initial proximity radius, and is referred to as a proximity circle. At block 908, the server compares the requested geofence count to the number of geofences within the proximity circle. If the requested geofence count is equal to the number of geofences, the server moves to block 918. At block 918, the server returns a set of geofences within the proximity circle and the radius of the circle to the user device.

Returning to block 908, if the number of geofences is smaller than the requested geofence count, the server moves to block 920. At block 920, the server searches outside of the proximity circle for a geofence that has the closest center to the approximate location of the device compared to other geofences outside of the proximity circle. The server designates this geofence as "geofence G." The server then moves to block 922. At block 922, the server determines whether the number of geofences in the proximity circle would be less than or equal to the requested geofence count if the radius of the proximity circle was expanded to the center of geofence G. If the number of geofences would be greater than the requested geofence count, the server moves to block 918, where the server returns a set of geofences within the current proximity circle and the radius of the circle to the user device. Conversely, if the number of geofences would be less than or equal to the requested geofence count, the server moves to block 924, where the server performs the radius expansion to the center of geofence G. The server then returns to block 908.

Returning to block 908, if the number of geofences is greater than the requested geofence count, the server moves to block 910. At block 910, the server identifies a geofence in the proximity circle where the center of the geofence is the furthest from the approximate location of the device. The server designates this geofence as "geofence F." At block 912, the server determines if the distance between the center of geofence F and the device location is greater than a minimum proximity radius. If the distance is not greater than the minimum proximity radius, the server moves to block 914.

At block 914, the server combines two geofences. In particular, the server combines two circular geofences to create a new geofence such that the new geofence's radius is minimized while completely covering both previous geofences. In one example, the server identifies geofences that have the same NID. The server then determines which two geofences that share the same NID are the closest to one another. The server represents the coordinates of the centers of these geofences as $(x1, y1)$, $(x2, y2)$. Additionally, the server represents their radii as r1 and r2. The server then calculates the center coordinates, $(x3, y3)$, of the new geofence using Equation [1] and Equation [2]:

$$x3 = \frac{x1 + x2}{2} \quad [1]$$

$$y3 = \frac{y1 + y2}{2} \quad [2]$$

The radius, r3, of the new geofence is calculated using Equation [3]:

$$r3 = \frac{r1 + r2 + \sqrt{(x1 - x2)^2 + (y1 - y2)^2}}{2} \quad [3]$$

The new geofence replaces the two geofences.

Returning to block 912, if the distance is not greater than the initial proximity radius, the server moves to block 916. At block 916, the server shrinks the initial radius to a new radius using Equation [4]:

New Radius=(distance between the center of geofence F and the device location)−unit of measurement [4]

Equation [4] shrinks the proximity radius only by the minimum amount possible so that the furthest geofence bounded by the proximity circle is removed from the circle. Thus, the "unit of measurement" represents a smallest unit of measurement allowed by the location accuracy of the geofencing framework. Additionally and/or alternatively, the "unit of measurement" can be any distance value set by the network. Once the server completes block 914 or 916, the server returns to block 908. The server performs the steps of workflow 900 until the server reaches block 918 of returning the geofences in the current proximity circle and the radius of the current proximity circle to the user device.

Figure 10A:
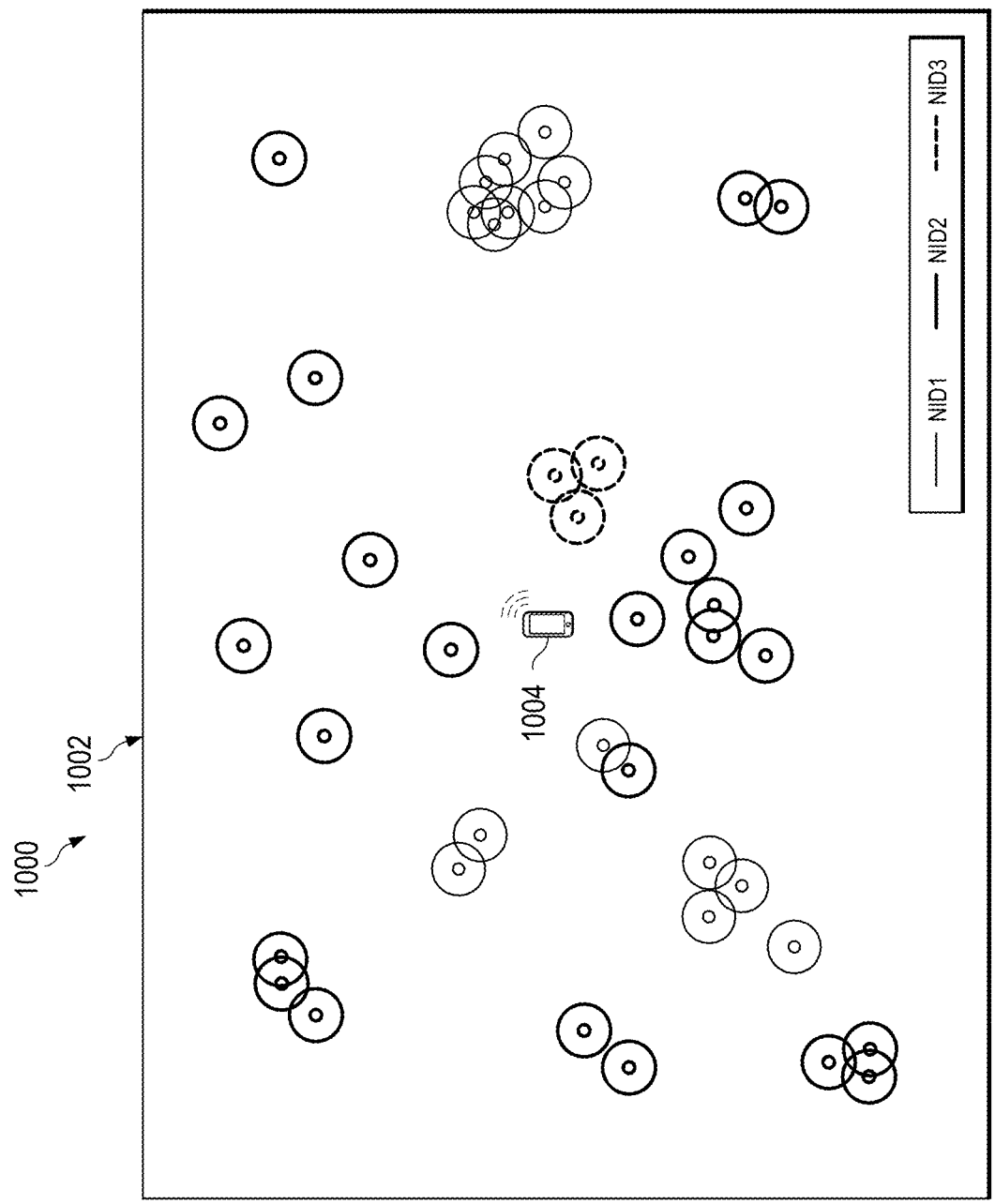
FIGS. 10A, 10B, 10C, and 10D illustrate an example of dynamic server-side aggregation, according to some implementations of the present disclosure.
Figure 10B:
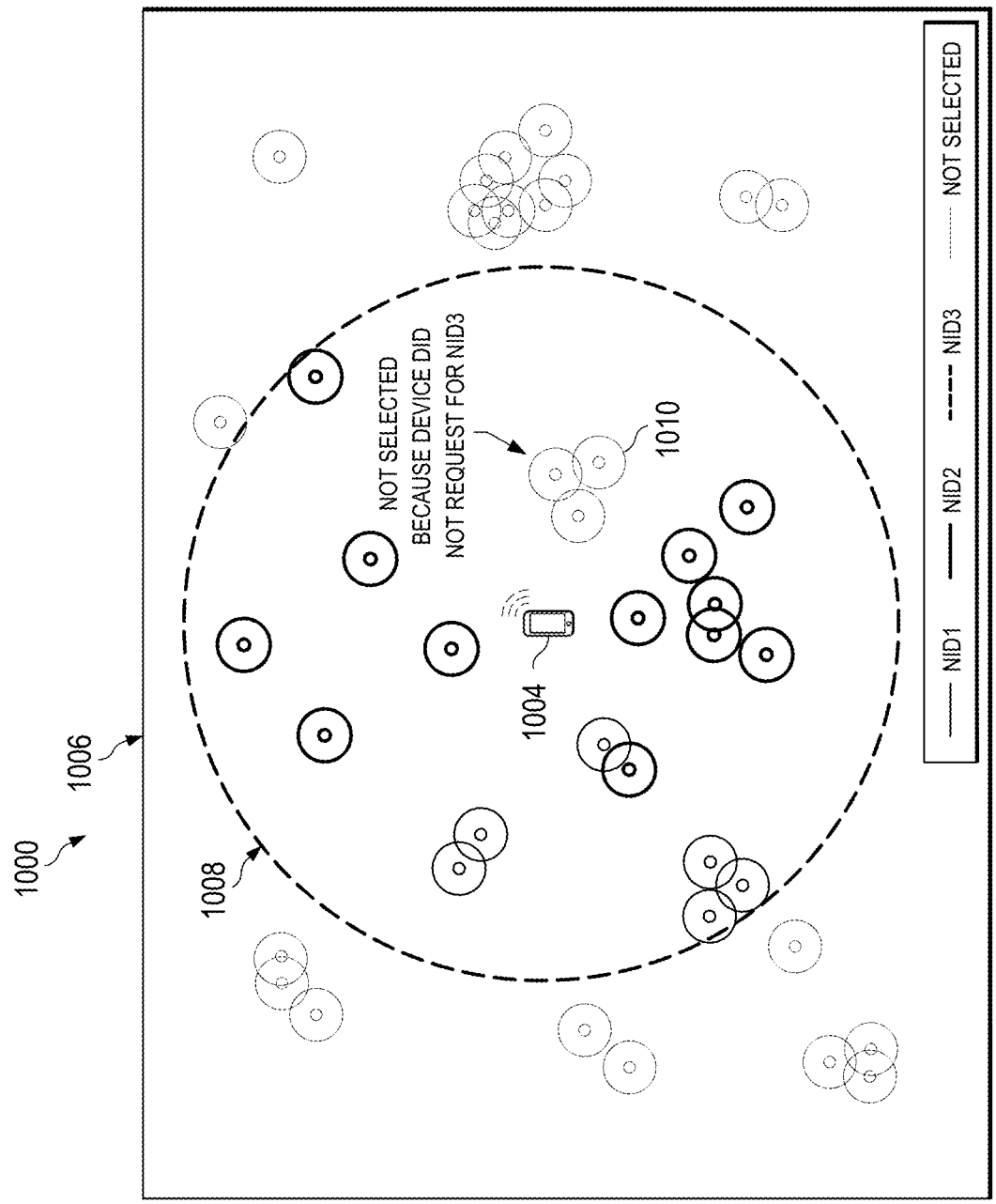
Figure 10C:
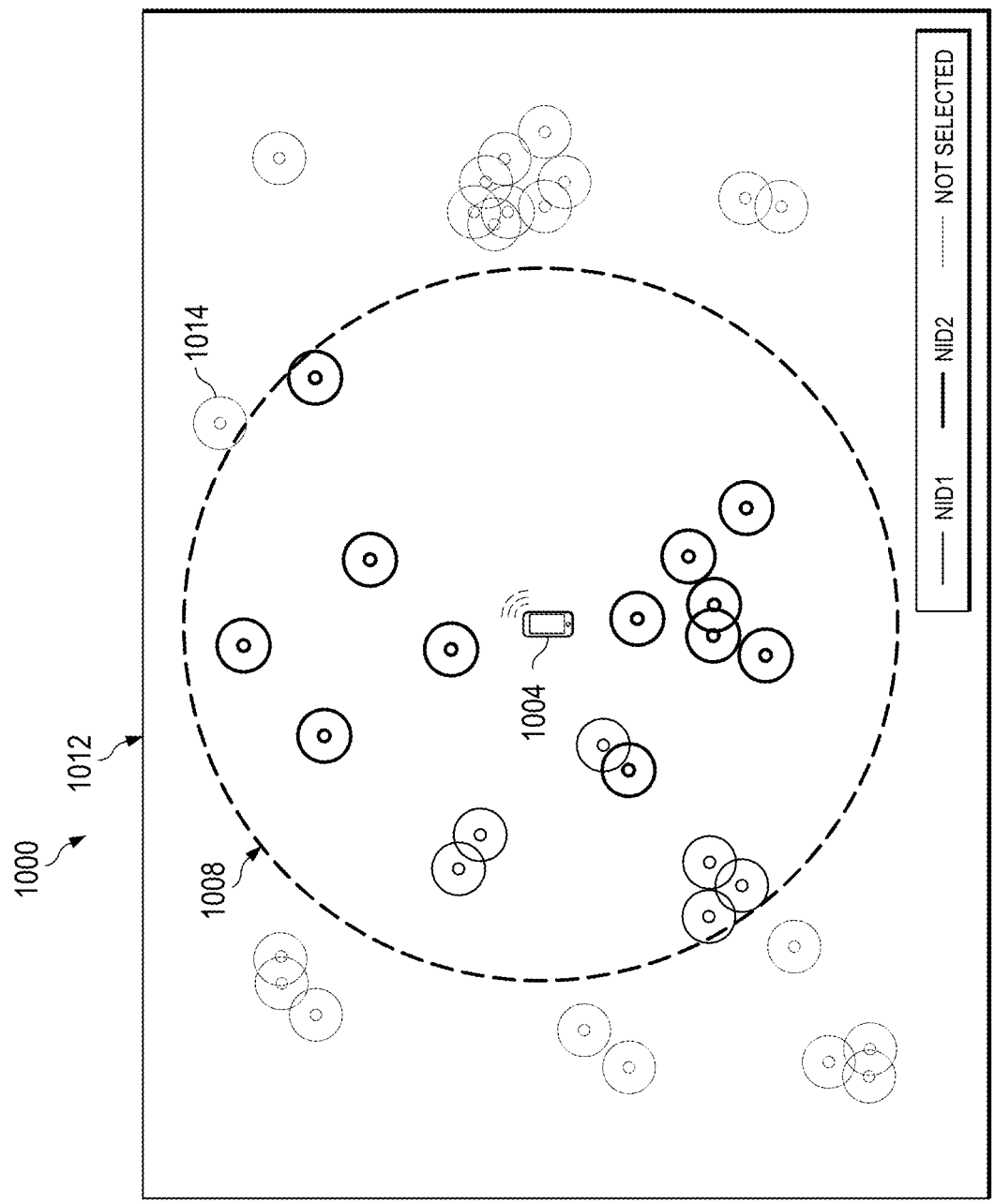

FIGS. 10A-10D illustrate an example 1000 of dynamic server-side aggregation, according to some implementations. FIG. 10A illustrates a window 1002 that includes existing geofence data in a server. As shown in FIG. 10A, the geofences are associated with three CBRS networks represented respectively as NID1, NID2, and NID3. In a first step of dynamic server-side aggregation, the server receives a geofence request from a user device 1004. The geofence request includes the device's approximate location, a list of requested NIDs, and a geofence count. In this example, the NID list includes [NID1, NID2], and the geofence count is 19. In a second step of dynamic server-side aggregation, the server draws a proximity circle with a default proximity radius around the device's approximate location. The server then identifies the geofences within the circle that are associated with the requested NIDs. As shown in window 1006 of FIG. 10B, the server draws a proximity circle 1008 around the device's approximate location and filters out geofences 1010 not associated with NID or NID2.

Figure 10D:
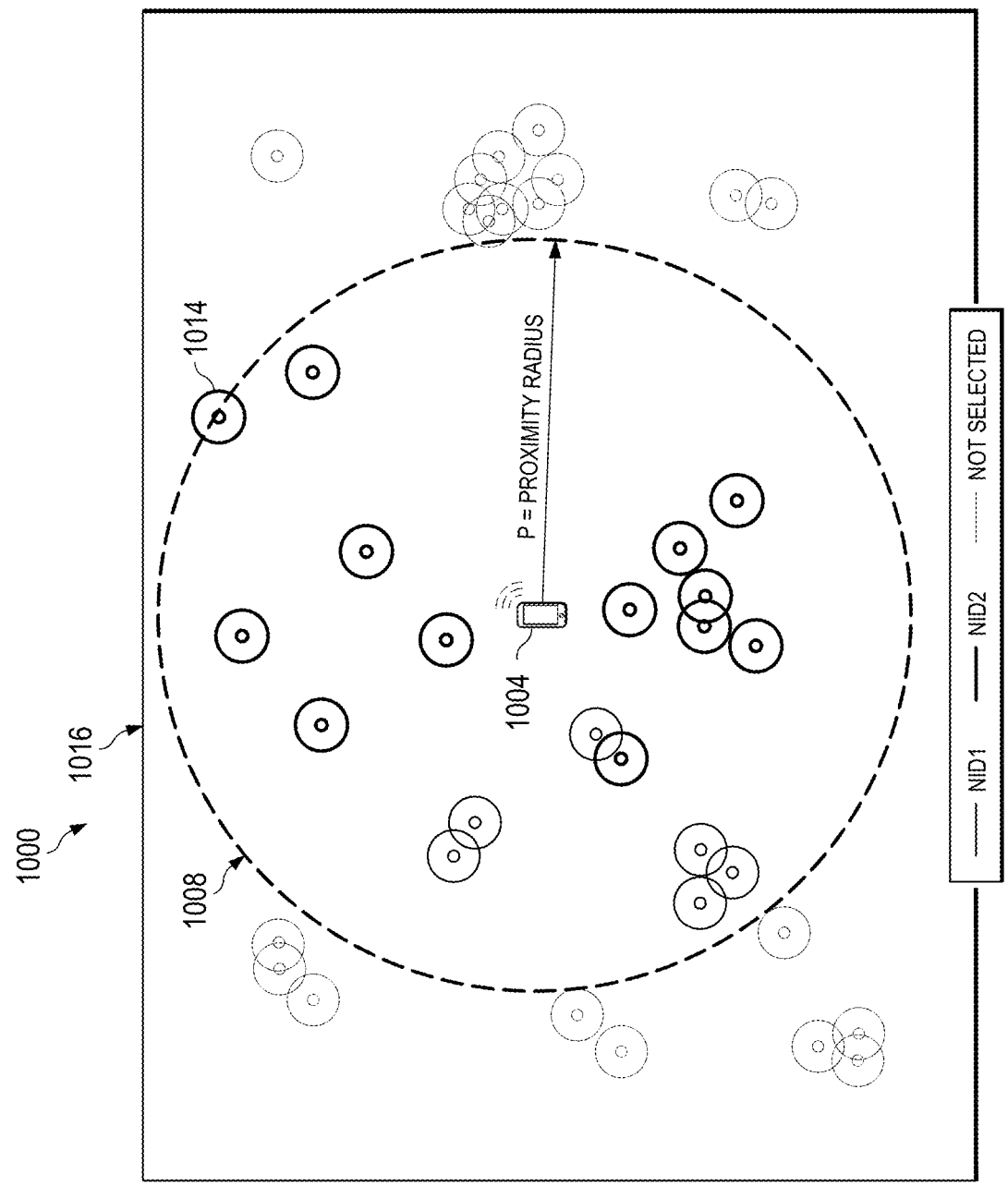

In a third step of dynamic server-side aggregation, the server compares the number of geofences within the proximity circle to the requested geofence count. In this example, and as shown in window 1012 of FIG. 10C, the requested number of geofences within the proximity circle 1008 is less than the requested geofence count. Accordingly, the server needs to expand the proximity circle to increase the number of geofences within the circle. In an example, the server searches outside of the proximity circle for a geofence that has the closest center to the approximate location of the device compared to other geofences outside of the proximity circle. In this example, the server identifies geofence 1014. The server performs the radius expansion to the center of the identified geofence. As shown in window 1016 of FIG. 10D, the server expands the proximity circle. The server then compares the number of geofences within the proximity circle to the requested geofence count. In this example, and as shown in FIG. 10D, the number of geofences within the proximity circle is equal to the requested geofence count. Accordingly, the server returns the geofences within the expanded proximity circle and the new proximity radius to the user device.

In some embodiments, the user device automatically caches geofence data. The user device can generate two types of caches: a routine-based geofence cache and a destination-based geofence cache. In a routine-based geofence cache, historical locations of the user device are analyzed to obtain a set of frequently/routinely visited locations (such as home and workplace). Geofences around the routine locations are downloaded and stored on the user device. Additionally, the user device can obtain geofences around frequently visited areas even in the absence of data connections (i.e., no request is made to a server). In a destination-based geofence cache, the user device analyzes incoming communications for possible future destinations. Then, geofences around future destinations are pre-downloaded and cached on the user device. Upon arriving at the destination, the user device may fetch geofences from the cache without data connectivity and use these geofences to enable CBRS automatically.

Figure 11:
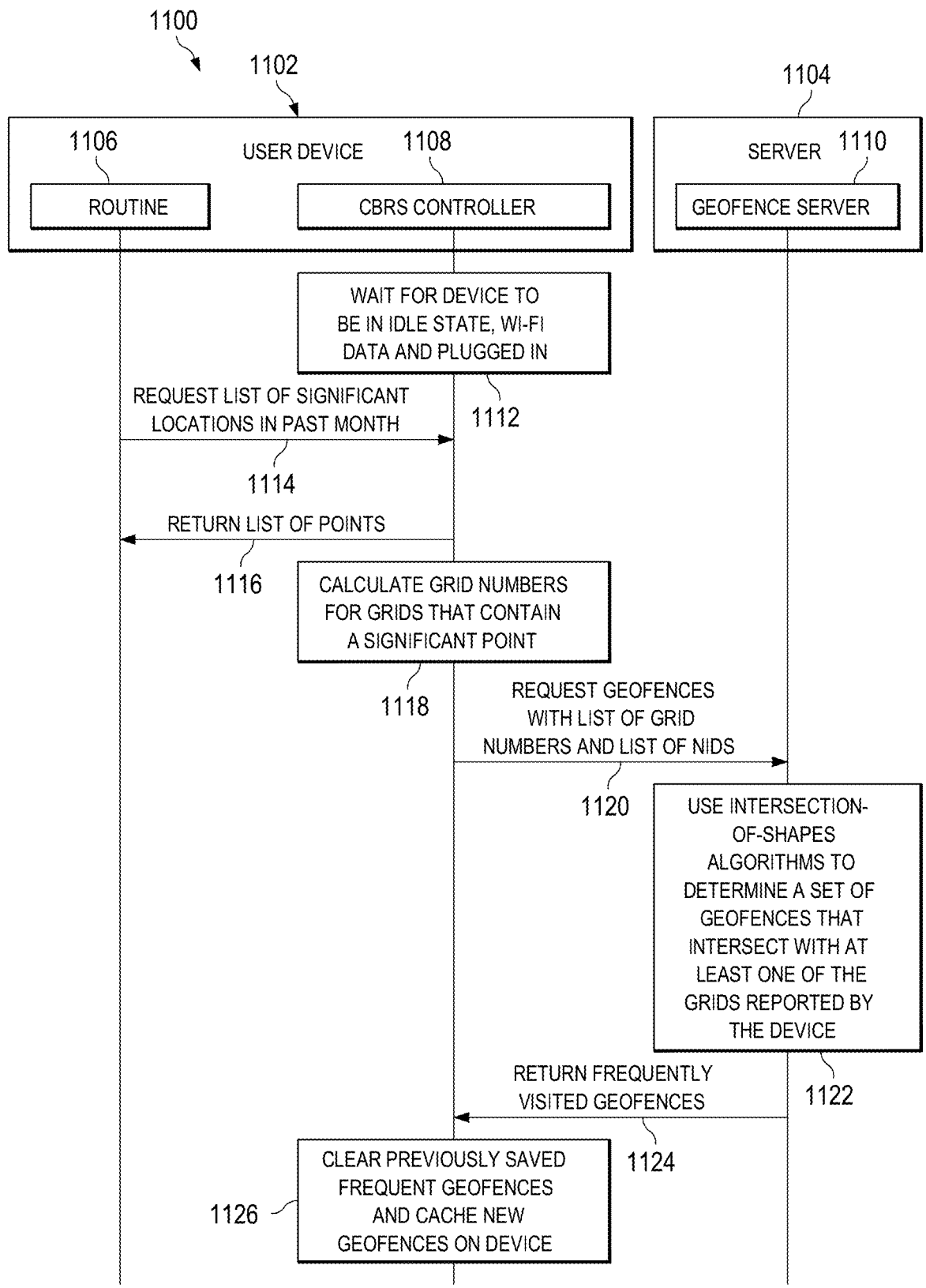
FIG. 11 illustrates a routine-based geofence cache workflow, according to some implementations of the present disclosure.

FIG. 11 illustrates a routine-based geofence cache workflow 1100, according to some implementations. The steps of the workflow 1100 may be performed by a user device 1102 or a server 1104. As shown in FIG. 11, the user device 1102 includes a routine module 1106 and a CBRS controller 1108. The server 1104 includes a geofence server 1110.

The workflow 1100 starts at step 1112. At step 1112, the CBRS controller 1108 waits for the user device 1102 to be in idle state, to operate on Wi-Fi data, and/or to be plugged into a power charger. At step 1114, the CBRS controller 1108 sends the routine module 1106 a request for a list of significant locations (e.g., a frequently visited location or a landmark) over a time period (e.g., a month). At step 1116, the routine module 1106 returns the requested list of locations to the CBRS controller 1108. At step 1118, the CBRS controller 1108 calculates grid numbers for grids that include a significant location. More specifically, a grid is generated over a map that includes the user device's location. Each grid is numbered using a common numbering scheme (i.e., known to the user device and the server). The CBRS controller determines the grid numbers for the grids that include a significant location.

At step 1120, the CBRS controller 1108 requests geofences by sending the geofence server 1110 a request that includes the list of grid numbers and a list of NIDs of the CBRS networks to which the user device may connect. At step 1122, the geofence server 1110 uses intersection-of-shapes algorithms to determine a set of geofences that intersect with at least one of the grids reported by the user device 1102. As step 1124, the geofence server 1110 then returns to the user device 1102 the set of geofences. In some examples, the geofence server 1110 may return a subset of the set of geofences, e.g., a subset of most frequently visited geofences. At step 1126, the CBRS controller 1108 clears previously saved frequent geofences and caches the received geofences on the user device 1102.

Figure 12A:
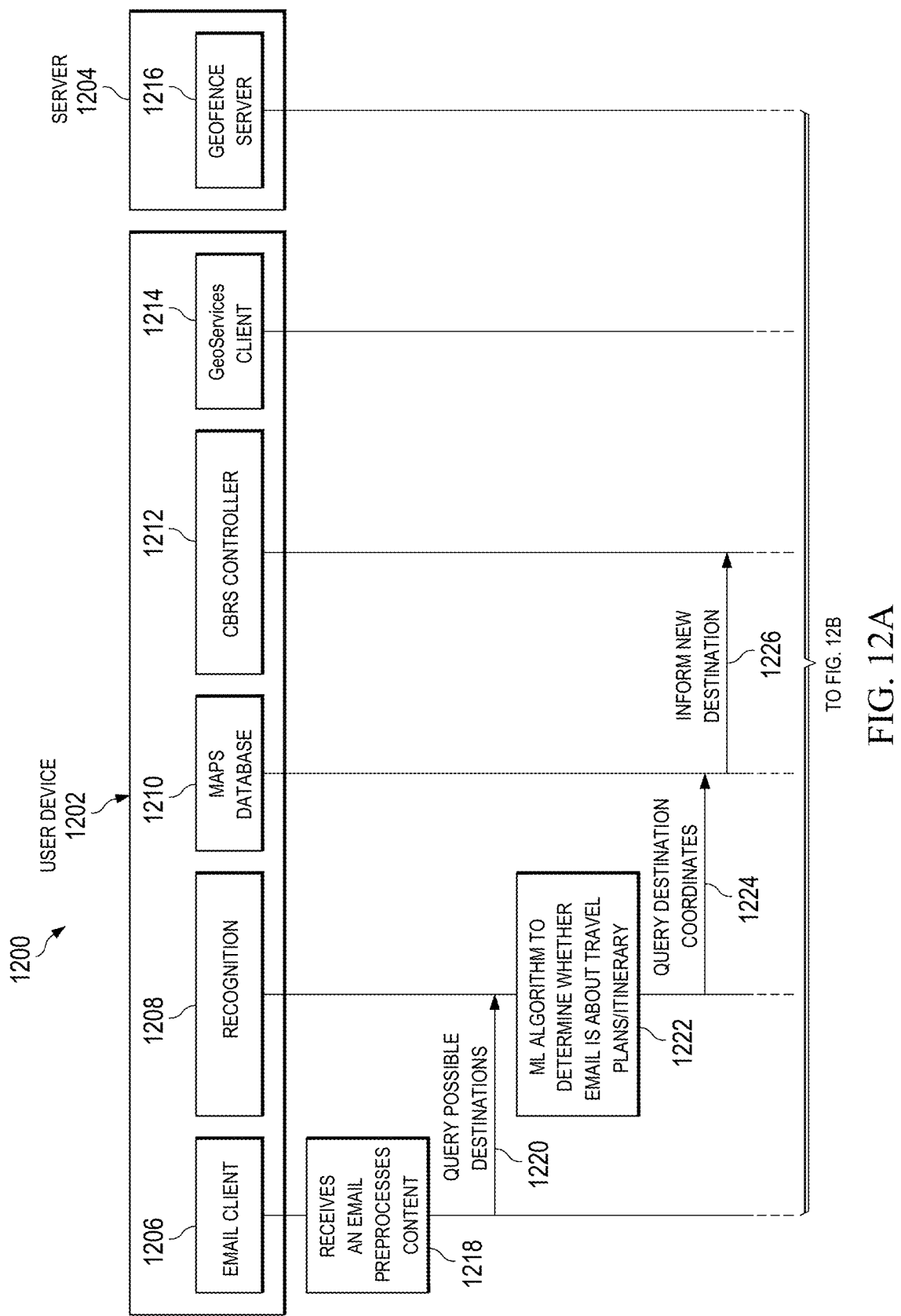
FIG. 12A and FIG. 12B illustrate a destination-based geofence cache workflow, according to some implementations of the present disclosure.
Figure 12B:
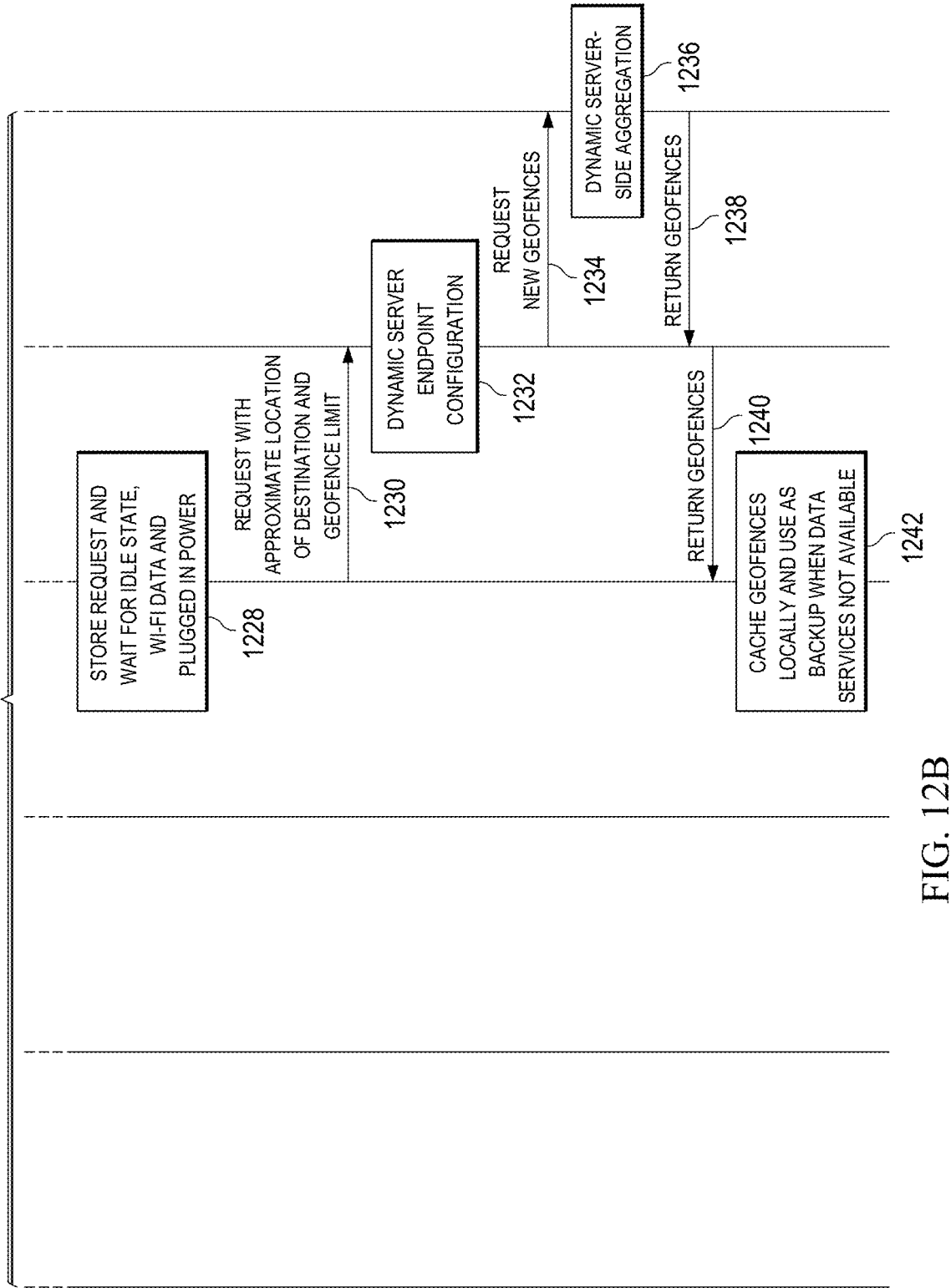

FIG. 12A and FIG. 12B illustrates a destination-based geofence cache workflow 1200, according to some implementations. The steps of the workflow 1200 may be performed by a user device 1202 or a server 1204. As shown in the figures, the user device 1202 includes an email client 1206, a recognition module 1208, a maps database 1210, a CBRS controller 1212, and a GeoServices client 1214. The server 1204 includes a geofence server 1216.

The workflow 1200 starts at step 1218. At step 1218, the email client 1206 receives an email and confidentially preprocesses its content. At step 1220, the email client 1206 sends a query of possible destinations to the recognition module 1208. At step 1222, the recognition module 1208 uses a machine-learning algorithm to determine whether the email is about travel plans/itinerary. At step 1224, the recognition module 1208 queries the maps database 1210 for destination coordinates. As step 1226, the maps database 1210 informs the CBRS controller 1212 of a new destination (e.g., by providing the coordinates of the destination). As step 1228, the CBRS controller 1212 stores the request and waits for an opportunity to communicate with the server 1204 (e.g., when the user device is an idle state, operating on Wi-Fi, and/or plugged into a power charger). At step 1230, the CBRS controller 1212 sends a request to the GeoServices client 1214 that includes an approximate location of the destination and a maximum geofence limit.

At step 1232, the GeoServices client 1214 applies dynamic endpoint switching to forward the request to the appropriate geofence server endpoint depending on the device's geographic region. In this example, the GeoServices client 1214, at step 1234, sends a request for geofences to the server 1204. The appropriate geofence server, e.g., geofence server 1216, receives the request and performs dynamic server-side aggregation at step 1236. The dynamic server-side aggregation uses the request to select geofences stored in the server 1204 to provide the user device 1202. The geofence server 1216 returns to the GeoServices client 1214 a list of geofences at step 1238. The GeoServices client 1214 provides the list of geofences to the CBRS controller 1212 at step 1240. At step 1242, the CBRS controller 1212 caches the geofences locally and uses them as backup when data services not available to the user device 1202.

In some embodiments, a user device and/or a server may perform maintenance operations on the geofence data. As an example, the maintenance operations may remove stale data from the geofence data. In particular, stale data is eliminated after a certain period (e.g., 30 days) if no additional reporting of successful camp-on of CBRS is received by the server. Elimination can be performed periodically (e.g., every 12 hours). As another example, the maintenance operations may enable deny-listing unreliable CBSDS, e.g., highly mobile or actively moving CBSDs, perhaps for a period of time. Highly mobile or actively moving CBSDs can be detected by showing up frequently in locations that are further apart than a CBSDs normal coverage distance. As yet another example, the maintenance operations may enable discarding reported data about deny-listed CBSDs. Thus, reported data about deny-listed CBSDs is ignored, and no geofences are set around these CBSDs until they are removed from deny list. Additionally, the maintenance operations enable manual entry of geofence data, e.g., by a CBRS network operator or provider. These geofences do not participate in static server-side aggregation and cannot be deny-listed. However, manually entered geofence do participate in dynamic server-side aggregation.

Figure 13:
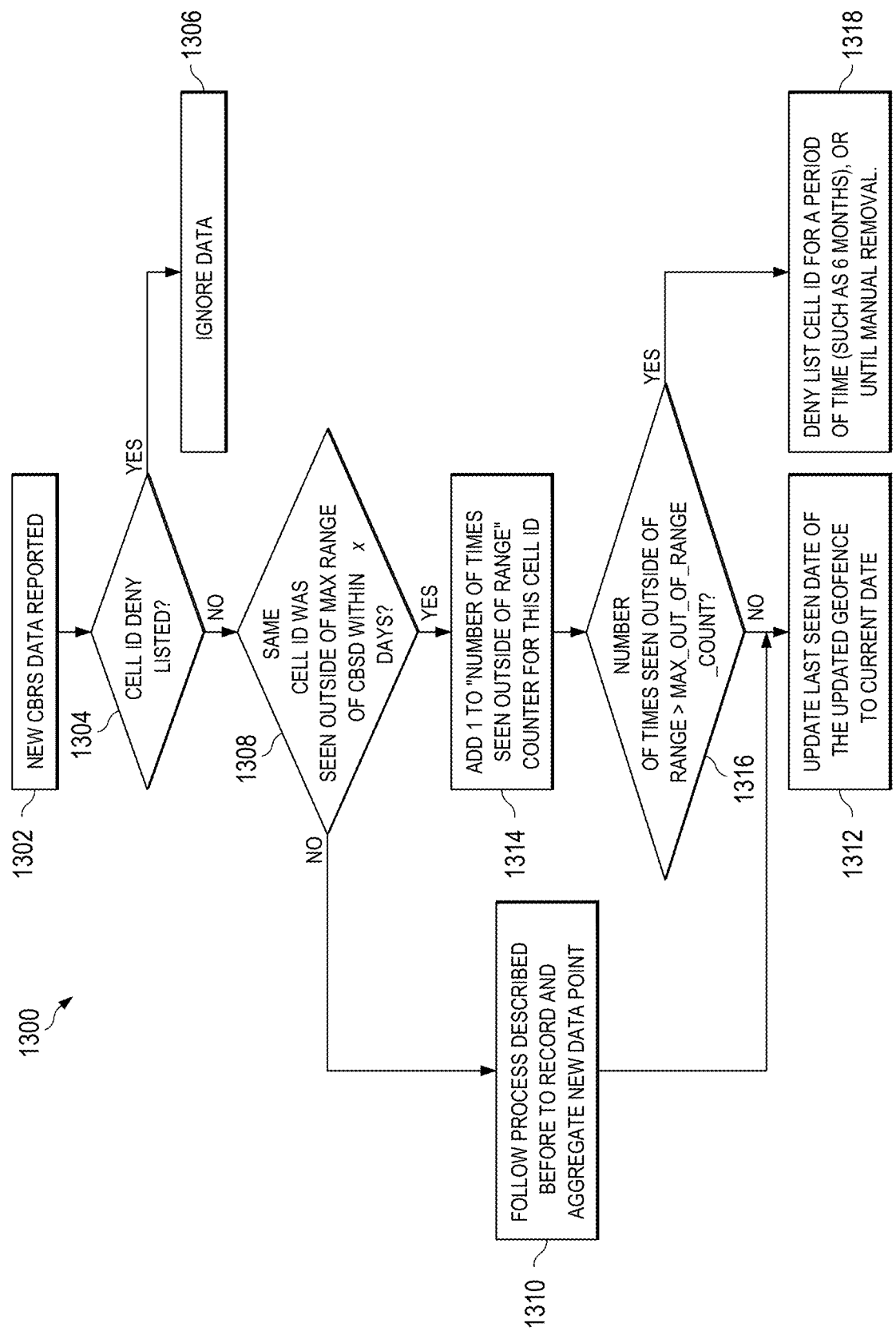
FIG. 13 illustrates a maintenance workflow, according to some implementations of the present disclosure.

FIG. 13 illustrates a maintenance workflow 1300, according to some implementations. At block 1302, a user device determines that new CBRS data is reported. At block 1304, the user device determines if the cell ID associated with the new CBRS data is deny listed. If the cell ID is deny listed, the user device ignores the data at block 1306. If the cell ID is not deny listed, the user device moves to block 1308, where the device determines whether the same cell ID was seen outside of max range of a CBSD within a particular period of time. The max range of a CBSD and/or the period of time can be predetermined. If the same cell ID was not seen outside of the max range of the CBSD, the device moves to block 1310. At block 1310, the device follow the previously described processes to record and aggregate the new data point. The device then updates the last seen date of the updated geofence to the current date at block 1312.

Returning to block 1308, if the same cell ID was seen outside of the max range of the CBSD, the device moves to block 1314. At block 1314, the user device adds 1 to a "number of times seen outside of range" counter for this cell ID. Then, at block 1316, the user device determines if the number of times seen outside of range is greater than a maximum out of range count. If the number of times is greater than the maximum out of range count, the user device moves to block 1318. At block 1318, the user device includes the cell ID in the deny list for a period of time (e.g., 6 months) or until manual removal. However, if the number of times is less than or equal to the maximum out of range count, the user device moves to block 1312, where the device updates the last seen date of the updated geofence to the current date.

Figure 14:
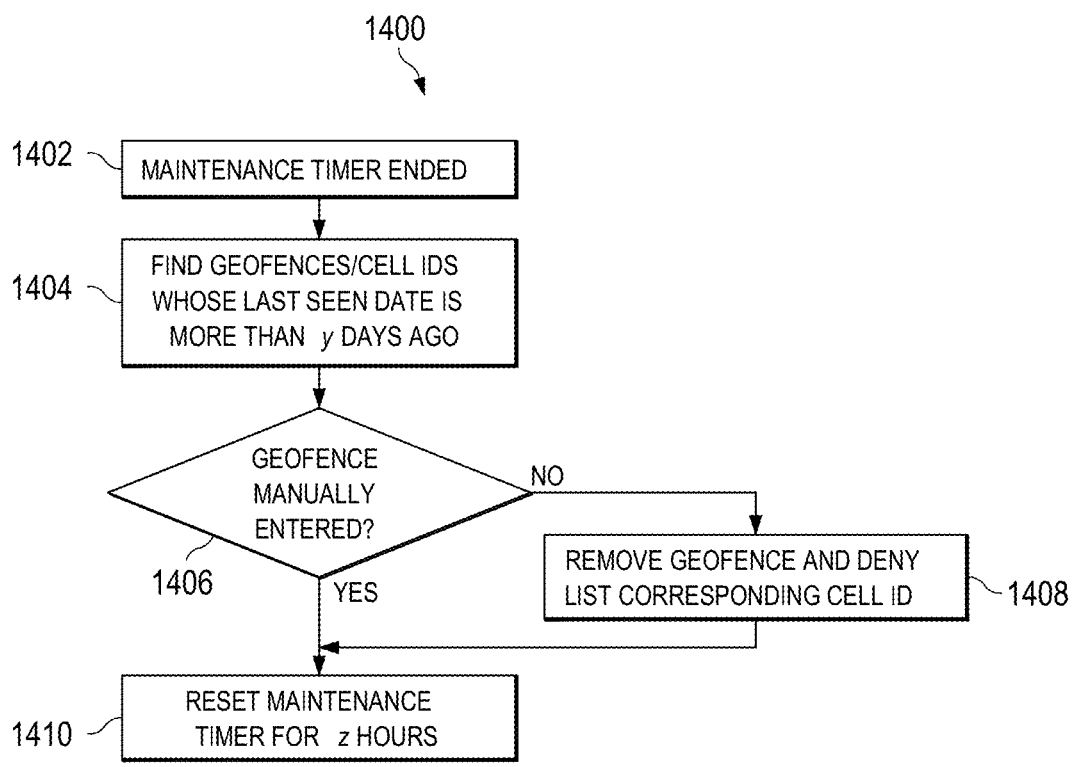
FIG. 14 illustrates another a maintenance workflow, according to some implementations of the present disclosure.

FIG. 14 illustrates a maintenance workflow 1400, according to some implementations. At block 1402, the user device determines that a maintenance timer ended. At block 1404, the user device identifies geofences and/or cell IDs whose last seen date is more than a threshold period of time. At block 1406, the user device determines if the geofence was entered manually, e.g., by a network operator. If the geofence was not entered manually, the user device moves to block 1408 where the device removes the geofence and includes the corresponding cell ID in a deny list. The user device then moves to block 1410, where the device resets the maintenance timer for z hours. Returning to block 1406, if the geofence was entered manually, the user device moves directly to block 1410.

Figure 15A:
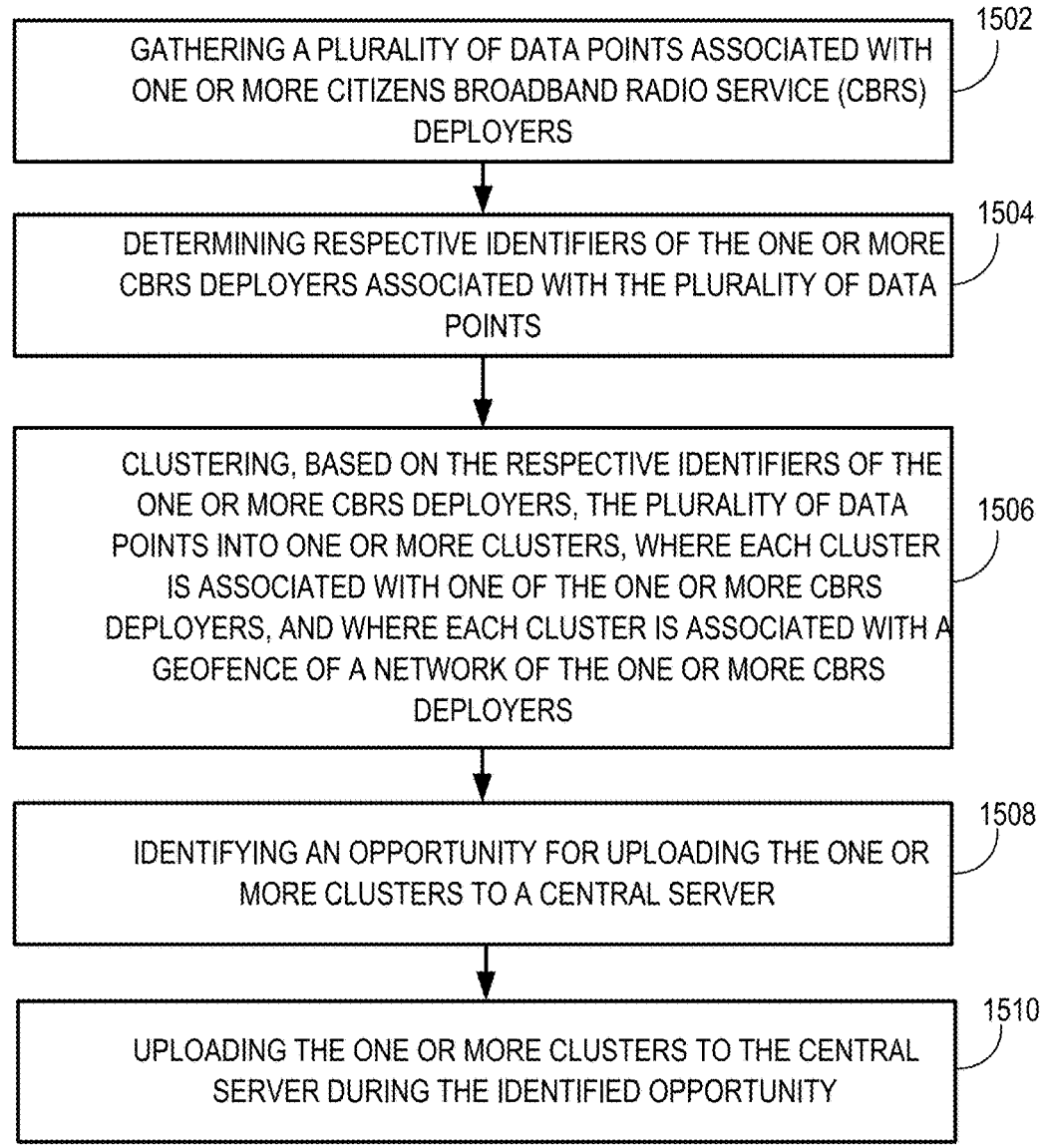
FIG. 15A and FIG. 15B each illustrate a flowchart of an example method, according to some implementations of the present disclosure.

FIG. 15A shows an example method 1500, according to some implementations. The method 1500 is for self-learning geofence data. For clarity of presentation, the description that follows generally describes method 1500 in the context of the other figures in this description. For example, method 1500 can be performed by a user device, e.g., user device 340. However, it will be understood that method 1500 can be performed, for example, by any suitable system, environment, software, hardware, or a combination of systems, environments, software, and hardware, as appropriate. In some implementations, various steps of method 1500 can be run in parallel, in combination, in loops, or in any order.

At step 1502, method 1500 involves gathering a plurality of data points associated with one or more Citizens Broadband Radio Service (CBRS) deployers.

At step 1504, method 1500 involves determining respective identifiers of the one or more CBRS deployers associated with the plurality of data points.

At step 1506, method 1500 involves clustering, based on the respective identifiers of the one or more CBRS deployers, the plurality of data points into one or more clusters, where each cluster is associated with one of the one or more CBRS deployers, and where each cluster is associated with a geofence of a network of the one or more CBRS deployers.

At step 1508, method 1500 involves identifying an opportunity for uploading the one or more clusters to a central server.

At step 1510, method 1500 involves uploading the one or more clusters to the central server during the identified opportunity.

In some implementations, the plurality of data points are data points from at least one of baseband, global positioning system (GPS), Wi-Fi, or telephony processes of the user device.

In some implementations, method 1500 further involves calculating a respective signal quality for each of the plurality of data points; and deleting a subset of data points that have a respective signal quality less than a predetermined threshold.

In some implementations, the respective signal quality is calculated based on one or more of Reference Signal Received Power (RSRP), Reference Signal Received Quality (RSRQ), Received Signal Strength Indicator (RSSI), Signal-to-noise ratio (SNR), and Signal-to-Interference-plus-Noise Ratio (SINR).

In some implementations, clustering, based on the respective identifiers of the one or more CBRS network deployers, the plurality of data points into one or more clusters involves for each data point: determining whether a center of a nearest cluster associated with the same CBRS deployer is less than a threshold distance away; if the center of the nearest cluster is less than or equal to the threshold distance away, adding the data point to the nearest cluster; and if the center of the nearest cluster is greater than the threshold distance, creating a new cluster with the data point as the center of the new cluster.

In some implementations, identifying an opportunity for uploading the one or more clusters to a central server involves identifying the opportunity based on a determination that the user device is plugged into power, that the user device is connected to Wi-Fi, and/or that the user device is idle.

In some implementations, uploading the one or more clusters to the central server during the identified opportunity involves uploading a threshold number of strongest data points in each cluster.

In some implementations, method 1500 further involves generating a request for geofence data, where the request includes an approximate location of the user device, a list of requested CBRS deployers, and a requested geofence count; providing the request to the central server; and receiving, from the central server, self-learned geofence data associated with the list of requested CBRS deployers.

In some implementations, method 1500 further involves using the self-learned geofence data to connect a CBRS network associated with one of the requested CBRS deployers.

Figure 15B:
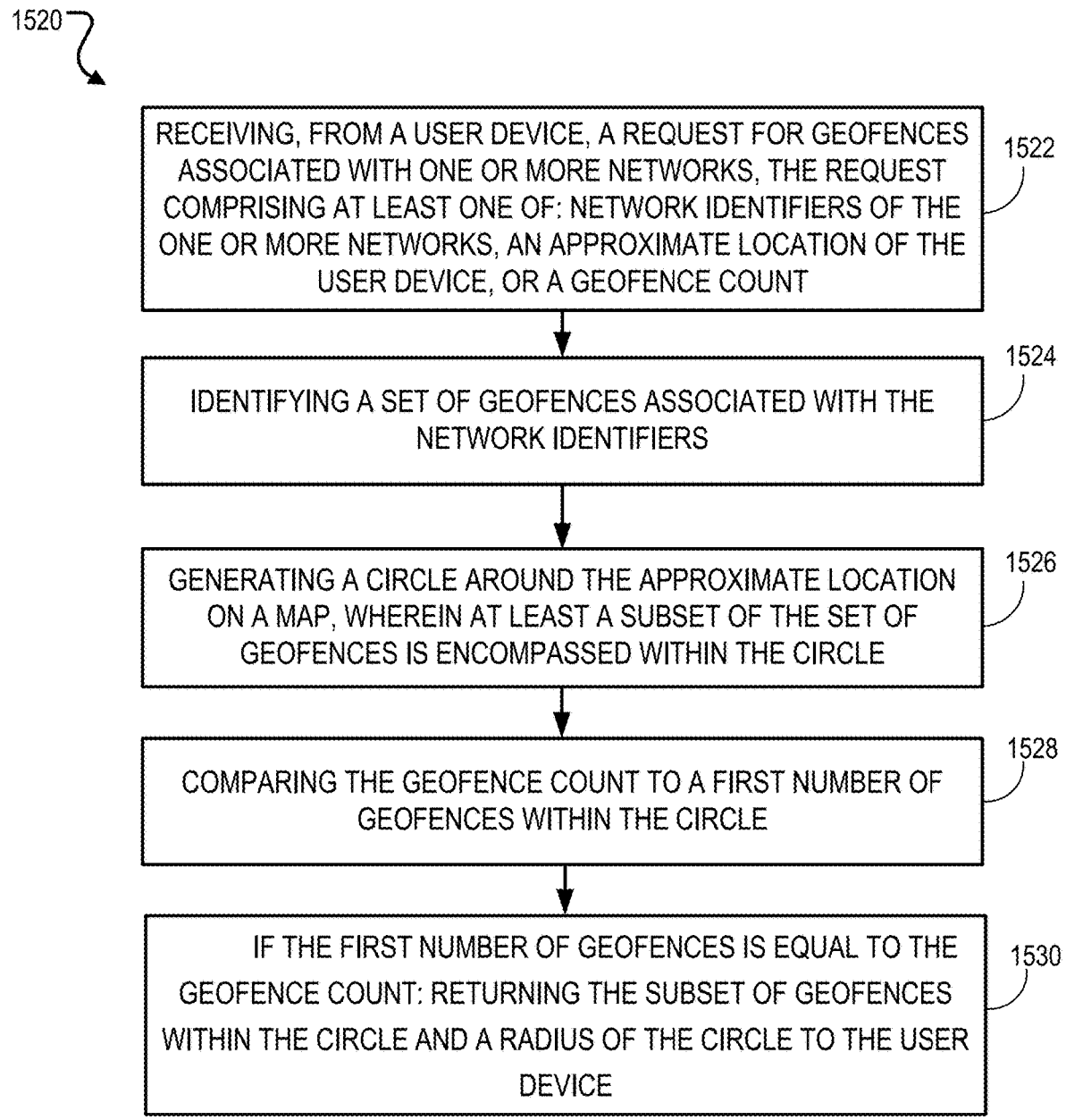

FIG. 15B shows an example method 1520, according to some implementations. The method 1520 is for dynamic server-side aggregation. For clarity of presentation, the description that follows generally describes method 1520 in the context of the other figures in this description. For example, method 1520 can be performed by a server, e.g., server 342. However, it will be understood that method 1520 can be performed, for example, by any suitable system, environment, software, hardware, or a combination of systems, environments, software, and hardware, as appropriate. In some implementations, various steps of method 1520 can be run in parallel, in combination, in loops, or in any order.

At step 1522, method 1520 involves receiving, from a user device, a request for geofences associated with one or more networks, the request includes at least one of: network identifiers of the one or more networks, an approximate location of the user device, or a geofence count.

At step 1524, method 1520 involves identifying a set of geofences associated with the network identifiers.

At step 1526, method 1520 involves generating a circle around the approximate location on a map, wherein at least a subset of the set of geofences is encompassed within the circle.

At step 1528, method 1520 involves comparing the geofence count to a first number of geofences within the circle.

At step 1530, method 1520 involves if the first number of geofences is equal to the geofence count, returning the subset of geofences within the circle and a radius of the circle to the user device.

In some implementations, method 1520 further involves if the first number of geofences is less than the geofence count: identifying a first geofence outside of the circle that has a center closest to the approximate location compared to other geofences outside of the circle; determining whether a second number of geofences in the circle would be less than or equal to the geofence count if the radius of the circle was expanded to the center of the first geofence; and if the second number of geofences would be greater than the geofence count, returning the subset of geofences within the circle and the radius of the circle to the user device.

In some implementations, method 1520 further involves if the second number of geofences would be less than or equal to the geofence count, expanding the radius of the circle to the center of the first geofence.

In some implementations, method 1520 further involves comparing the second number of geofences to the geofence count; and in response to determining that the second number of geofences is equal to the geofence count, returning a second subset of geofences within the expanded circle and the expanded radius to the user device.

In some implementations, method 1520 further involves if the first number of geofences is greater than the geofence count: identifying a first geofence within the circle that has a center furthest from the approximate location of the user device compared to other geofences in the circle; determining if a distance between the center of the first geofence and the approximate location is greater than a predetermined minimum radius; and if the distance is less than or equal to the predetermined minimum radius, combining two geofences within the circle to create a new geofence that encompasses an area covered by the two geofences.

In some implementations, where there is a second number of geofences in the circle after combining the two geofences, and where method 1520 further involves comparing the second number of geofences to the geofence count; and in response to determining that the second number of geofences is equal to the geofence count, returning a second subset of geofences within the circle and the radius of the circle to the user device.

In some implementations, method 1520 further involves if the distance is greater than the predetermined minimum radius, shrinking the radius of the circle to a new radius based on the distance between the center of the first geofence and the approximate location.

In some implementations, where there is a second number of geofences in the circle after shrinking the radius, and where method 1520 further involves comparing the second number of geofences to the geofence count; and in response to determining that the second number of geofences is equal to the geofence count, returning a second subset of geofences within the circle and the new radius of the circle to the user device.

Figure 16:
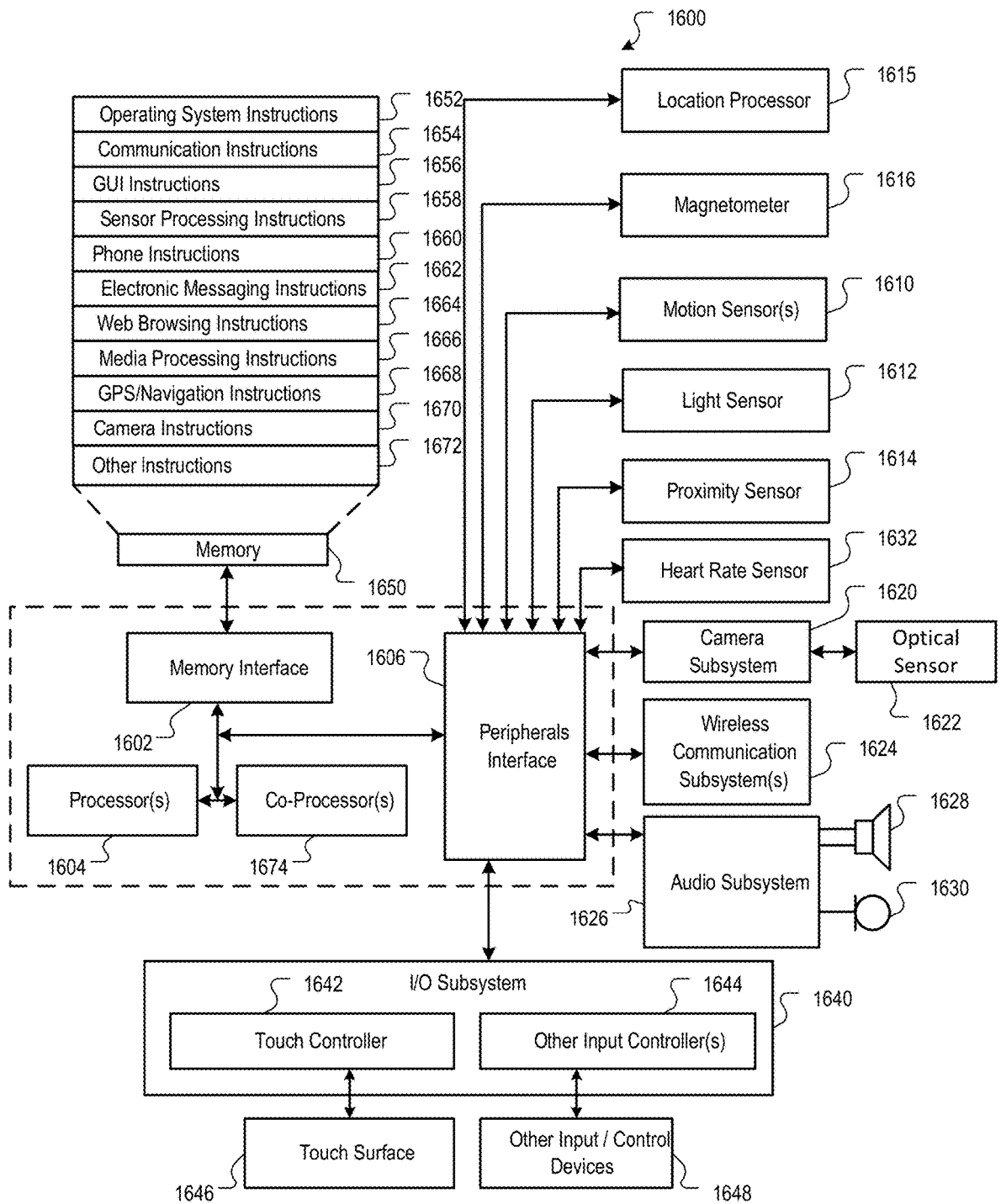
FIG. 16 is a block diagram of an example architecture for implementing the features and processes described in reference to FIGS. 1-15B.

FIG. 16 is a block diagram of an example device architecture 1600 for implementing the features and processes described in reference to FIGS. 1-15B. For example, the architecture 1600 can be used to implement the user device 340 and/or the server 342. Architecture 1600 may be implemented in any device for generating the features described in reference to FIGS. 1-15B, including but not limited to desktop computers, server computers, portable computers, smart phones, tablet computers, game consoles, wearable computers, set top boxes, media players, smart TVs, and the like.

The architecture 1600 can include a memory interface 1602, one or more data processor 1604, one or more data co-processors 1674, and a peripherals interface 1606. The memory interface 1602, the processor(s) 1604, the co-processor(s) 1674, and/or the peripherals interface 1606 can be separate components or can be integrated in one or more integrated circuits. One or more communication buses or signal lines may couple the various components.

The processor(s) 1604 and/or the co-processor(s) 1674 can operate in conjunction to perform the operations described herein. For instance, the processor(s) 1604 can include one or more central processing units (CPUs) that are configured to function as the primary computer processors for the architecture 1600. As an example, the processor(s) 1604 can be configured to perform generalized data processing tasks of the architecture 1600. Further, at least some of the data processing tasks can be offloaded to the co-processor(s) 1674. For example, specialized data processing tasks, such as processing motion data, processing image data, encrypting data, and/or performing certain types of arithmetic operations, can be offloaded to one or more specialized co-processor(s) 1674 for handling those tasks. In some cases, the processor(s) 1604 can be relatively more powerful than the co-processor(s) 1674 and/or can consume more power than the co-processor(s) 1674. This can be useful, for example, as it enables the processor(s) 1604 to handle generalized tasks quickly, while also offloading certain other tasks to co-processor(s) 1674 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 1604 for further analysis.

Sensors, devices, and subsystems can be coupled to peripherals interface 1606 to facilitate multiple functionalities. For example, a motion sensor 1610, a light sensor 1612, and a proximity sensor 1614 can be coupled to the peripherals interface 1606 to facilitate orientation, lighting, and proximity functions of the architecture 1600. For example, in some implementations, a light sensor 1612 can be utilized to facilitate adjusting the brightness of a touch surface 1646. In some implementations, a motion sensor 1610 can be utilized to detect movement and orientation of the device. For example, the motion sensor 1610 can include one or more accelerometers (e.g., to measure the acceleration experienced by the motion sensor 1610 and/or the architecture 1600 over a period of time), and/or one or more compasses or gyros (e.g., to measure the orientation of the motion sensor 1610 and/or the mobile device). In some cases, the measurement information obtained by the motion sensor 1610 can be in the form of one or more time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 1610 can be directly integrated into a co-processor 1674 configured to processes measurements obtained by the motion sensor 1610. For example, a co-processor 1674 can include one more accelerometers, compasses, and/or gyroscopes, and can be configured to obtain sensor data from each of these sensors, process the sensor data, and transmit the processed data to the processor(s) 1604 for further analysis.

Other sensors may also be connected to the peripherals interface 1606, such as a temperature sensor, a biometric sensor, or other sensing device, to facilitate related functionalities. As an example, as shown in FIG. 16, the architecture 1600 can include a heart rate sensor 1632 that measures the beats of a user's heart. Similarly, these other sensors also can be directly integrated into one or more co-processor(s) 1674 configured to process measurements obtained from those sensors.

A location processor 1615 (e.g., a GNSS receiver chip) can be connected to the peripherals interface 1606 to provide geo-referencing. An electronic magnetometer 1616 (e.g., an integrated circuit chip) can also be connected to the peripherals interface 1606 to provide data that may be used to determine the direction of magnetic North. Thus, the electronic magnetometer 1616 can be used as an electronic compass.

A camera subsystem 1620 and an optical sensor 1622 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 1624. The communication subsystem(s) 1624 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 1624 can depend on the communication network(s) or medium(s) over which the architecture 1600 is intended to operate. For example, the architecture 1600 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 1600 can be configured as a base station for other wireless devices. As another example, the communication subsystems 1624 may allow the architecture 1600 to synchronize with a host device using one or more protocols, such as, for example, the TCP/IP protocol, HTTP protocol, UDP protocol, and any other known protocol.

An audio subsystem 1626 can be coupled to a speaker 1628 and one or more microphones 1630 to facilitate voice-enabled functions, such as voice recognition, voice replication, digital recording, and telephony functions.

An I/O subsystem 1640 can include a touch controller 1642 and/or other input controller(s) 1644. The touch controller 1642 can be coupled to a touch surface 1646. The touch surface 1646 and the touch controller 1642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 1646. In one implementations, the touch surface 1646 can display virtual or soft buttons and a virtual keyboard, which can be used as an input/output device by the user.

Other input controller(s) 1644 can be coupled to other input/control devices 1648, such as one or more buttons, rocker switches, thumb-wheel, infrared port, USB port, and/or a pointer device such as a stylus. The one or more buttons (not shown) can include an up/down button for volume control of the speaker 1628 and/or the microphone 1630.

In some implementations, the architecture 1600 can present recorded audio and/or video files, such as MP3, AAC, and MPEG video files. In some implementations, the architecture 1600 can include the functionality of an MP3 player and may include a pin connector for tethering to other devices. Other input/output and control devices may be used.

A memory interface 1602 can be coupled to a memory 1650. The memory 1650 can include high-speed random access memory or non-volatile memory, such as one or more magnetic disk storage devices, one or more optical storage devices, or flash memory (e.g., NAND, NOR). The memory 1650 can store an operating system 1652, such as Darwin, RTXC, LINUX, UNIX, OS X, WINDOWS, or an embedded operating system such as VxWorks. The operating system 1652 can include instructions for handling basic system services and for performing hardware dependent tasks. In some implementations, the operating system 1652 can include a kernel (e.g., UNIX kernel).

The memory 1650 can also store communication instructions 1654 to facilitate communicating with one or more additional devices, one or more computers or servers, including peer-to-peer communications. The communication instructions 1654 can also be used to select an operational mode or communication medium for use by the device, based on a geographic location (obtained by the GPS/Navigation instructions 1668) of the device. The memory 1650 can include graphical user interface instructions 1656 to facilitate graphic user interface processing, including a touch model for interpreting touch inputs and gestures; sensor processing instructions 1658 to facilitate sensor-related processing and functions; phone instructions 1660 to facilitate phone-related processes and functions; electronic messaging instructions 1662 to facilitate electronic-messaging related processes and functions; web browsing instructions 1664 to facilitate web browsing-related processes and functions; media processing instructions 1666 to facilitate media processing-related processes and functions; GPS/Navigation instructions 1668 to facilitate GPS and navigation-related processes; camera instructions 1670 to facilitate camera-related processes and functions; and other instructions 1672 for performing some or all of the processes described herein.

Each of the above identified instructions and applications can correspond to a set of instructions for performing one or more functions described herein. These instructions need not be implemented as separate software programs, procedures, or modules. The memory 1650 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method to be performed by a user device, the method comprising:
   gathering a plurality of data points associated with one or more Citizens Broadband Radio Service (CBRS) deployers;
   determining respective identifiers of the one or more CBRS deployers associated with the plurality of data points;
   clustering, based on the respective identifiers of the one or more CBRS deployers, the plurality of data points into one or more clusters, wherein each cluster is associated with one of the one or more CBRS deployers, and wherein each cluster is associated with a geofence of a network of the one or more CBRS deployers;
   identifying an opportunity for uploading the one or more clusters to a central server; and
   uploading the one or more clusters to the central server during the identified opportunity.

2. The method of claim 1, wherein the plurality of data points are data points from at least one of baseband, global positioning system (GPS), Wi-Fi, or telephony processes of the user device.

3. The method of claim 1, further comprising:
   calculating a respective signal quality for each of the plurality of data points; and
   deleting a subset of data points that have a respective signal quality less than a predetermined threshold.

4. The method of claim 1, wherein the respective signal quality is calculated based on one or more of Reference Signal Received Power (RSRP), Reference Signal Received Quality (RSRQ), Received Signal Strength Indicator (RSSI), Signal-to-noise ratio (SNR), and Signal-to-Interference-plus-Noise Ratio (SINR).

5. The method of claim 1, wherein clustering, based on the respective identifiers of the one or more CBRS deployers, the plurality of data points into one or more clusters comprises:
for each data point:
determining whether a center of a nearest cluster associated with a same CBRS deployer is less than a threshold distance away;
if the center of the nearest cluster is less than or equal to the threshold distance away, adding the data point to the nearest cluster; and
if the center of the nearest cluster is greater than the threshold distance, creating a new cluster with the data point as the center of the new cluster.

6. The method of claim 1, wherein identifying an opportunity for uploading the one or more clusters to a central server comprises:
identifying the opportunity based on a determination that the user device is plugged into power, that the user device is connected to Wi-Fi, and/or that the user device is idle.

7. The method of claim 1, wherein uploading the one or more clusters to the central server during the identified opportunity comprises:
uploading a threshold number of strongest data points in each cluster.

8. The method of claim 1, further comprising:
generating a request for geofence data, wherein the request comprises an approximate location of the user device, a list of requested CBRS deployers, and a requested geofence count;
providing the request to the central server; and
receiving, from the central server, self-learned geofence data associated with the list of requested CBRS deployers.

9. The method of claim 1, further comprising:
using the self-learned geofence data to connect a CBRS network associated with one of the requested CBRS deployers.

10. A system comprising:
one or more processors configured to perform operations comprising:
gathering a plurality of data points associated with one or more Citizens Broadband Radio Service (CBRS) deployers;
determining respective identifiers of the one or more CBRS deployers associated with the plurality of data points;
clustering, based on the respective identifiers of the one or more CBRS deployers, the plurality of data points into one or more clusters, wherein each cluster is associated with one of the one or more CBRS deployers, and wherein each cluster is associated with a geofence of a network of the one or more CBRS deployers;
identifying an opportunity for uploading the one or more clusters to a central server; and
uploading the one or more clusters to the central server during the identified opportunity.

11. The system of claim 10, wherein the plurality of data points are data points from at least one of baseband, global positioning system (GPS), Wi-Fi, or telephony processes of a user device.

12. The system of claim 10, the operations further comprising:
calculating a respective signal quality for each of the plurality of data points; and
deleting a subset of data points that have a respective signal quality less than a predetermined threshold.

13. One or more processors of a user device, the one or more processors configured to perform operations comprising:
gathering a plurality of data points associated with one or more Citizens Broadband Radio Service (CBRS) deployers;
determining respective identifiers of the one or more CBRS deployers associated with the plurality of data points;
clustering, based on the respective identifiers of the one or more CBRS deployers, the plurality of data points into one or more clusters, wherein each cluster is associated with one of the one or more CBRS deployers, and wherein each cluster is associated with a geofence of a network of the one or more CBRS deployers;
identifying an opportunity for uploading the one or more clusters to a central server; and
uploading the one or more clusters to the central server during the identified opportunity.

14. The one or more processors of claim 13, wherein the plurality of data points are data points from at least one of baseband, global positioning system (GPS), Wi-Fi, or telephony processes of the user device.

15. The one or more processors of claim 13, the operations further comprising:
calculating a respective signal quality for each of the plurality of data points; and
deleting a subset of data points that have a respective signal quality less than a predetermined threshold.

16. The one or more processors of claim 13, wherein the respective signal quality is calculated based on one or more of Reference Signal Received Power (RSRP), Reference Signal Received Quality (RSRQ), Received Signal Strength Indicator (RSSI), Signal-to-noise ratio (SNR), and Signal-to-Interference-plus-Noise Ratio (SINR).

17. The one or more processors of claim 13, wherein clustering, based on the respective identifiers of the one or more CBRS deployers, the plurality of data points into one or more clusters comprises:
for each data point:
determining whether a center of a nearest cluster associated with a same CBRS deployer is less than a threshold distance away;
if the center of the nearest cluster is less than or equal to the threshold distance away, adding the data point to the nearest cluster; and
if the center of the nearest cluster is greater than the threshold distance, creating a new cluster with the data point as the center of the new cluster.

18. The one or more processors of claim 13, wherein identifying an opportunity for uploading the one or more clusters to a central server comprises:
identifying the opportunity based on a determination that the user device is plugged into power, that the user device is connected to Wi-Fi, and/or that the user device is idle.

19. The one or more processors of claim 13, wherein uploading the one or more clusters to the central server during the identified opportunity comprises:
uploading a threshold number of strongest data points in each cluster.

20. The one or more processors of claim 13, the operations further comprising:

generating a request for geofence data, wherein the request comprises an approximate location of the user device, a list of requested CBRS deployers, and a requested geofence count;
providing the request to the central server; and
receiving, from the central server, self-learned geofence data associated with the list of requested CBRS deployers.

\* \* \* \* \*